US012256410B2

United States Patent
Tsai et al.

(10) Patent No.: US 12,256,410 B2
(45) Date of Patent: Mar. 18, 2025

(54) METHOD AND DEVICE FOR PERFORMING CONFIGURED GRANT-BASED SMALL DATA TRANSMISSION

(71) Applicant: SHARP KABUSHIKI KAISHA, Sakai (JP)

(72) Inventors: Hsin-Hsi Tsai, Taipei (TW); Heng-Li Chin, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 454 days.

(21) Appl. No.: 17/847,945

(22) Filed: Jun. 23, 2022

(65) Prior Publication Data

US 2022/0417983 A1 Dec. 29, 2022

Related U.S. Application Data

(60) Provisional application No. 63/214,507, filed on Jun. 24, 2021.

(51) Int. Cl.
*H04W 72/23* (2023.01)
*H04B 17/318* (2015.01)
*H04W 56/00* (2009.01)
*H04W 76/30* (2018.01)

(52) U.S. Cl.
CPC .......... *H04W 72/23* (2023.01); *H04B 17/318* (2015.01); *H04W 56/001* (2013.01); *H04W 56/004* (2013.01); *H04W 76/30* (2018.02)

(58) Field of Classification Search
CPC .. H04W 76/30; H04W 56/001; H04W 56/004
USPC ................ 370/329, 300, 401, 405
See application file for complete search history.

(56) References Cited

U.S. PATENT DOCUMENTS

2021/0360610 A1 11/2021 Kim et al.
2024/0155502 A1* 5/2024 Lin ...................... H04W 52/36

FOREIGN PATENT DOCUMENTS

CN 112997443 A 6/2021
WO 2021088946 A1 5/2021

OTHER PUBLICATIONS

Asia Pacific Telecom, FGI, "CG-SDT based on beam operation", R2-2103265, Apr. 1, 2021.
Qualcomm Incorporated, "Discussion on CG based NR small data transmission", R2-2103434, Apr. 2, 2021.
Asia Pacific Telecom, FGI, "Beam operation for CG-SDT", R2-2101837, Jan. 15, 2021.
(Continued)

*Primary Examiner* — Dang T Ton
(74) *Attorney, Agent, or Firm* — ScienBiziP, P.C.

(57) ABSTRACT

A method for a UE for performing a CG-SDT is provided. The method includes receiving a CG-SDT-specific RSRP threshold from a BS, the CG-SDT-specific RSRP threshold being configured to the UE for an SSB selection for the CG-SDT; in a case that one or more SSBs with RSRPs above the CG-SDT-specific RSRP threshold are available, performing the SSB selection to determine a first SSB index from one or more SSB indices of the one or more SSBs; and performing an initial transmission of the CG-SDT or a subsequent new transmission of the CG-SDT through a first UL grant corresponding to the first SSB index.

20 Claims, 10 Drawing Sheets

(56) References Cited

OTHER PUBLICATIONS

3GPP TS 38.321, "3rd Generation Partnership Project; Technical Specification Group Radio Access Network; NR; Medium Access Control (MAC) protocol specification (Release 16)", V16.4.0 (Mar. 2021).
3GPP TS 38.212, "3rd Generation Partnership Project; Technical Specification Group Radio Access Network; NR; Multiplexing and channel coding (Release 16)", V16.5.0 (Mar. 2021).
3GPP TS 38.213, "3rd Generation Partnership Project; Technical Specification Group Radio Access Network; NR; Physical layer procedures for control (Release 16)", V16.5.0 (Mar. 2021).
3GPP TS 38.331, "3rd Generation Partnership Project; Technical Specification Group Radio Access Network; NR; Radio Resource Control (RRC) protocol specification (Release 16)", V16.4.1 (Mar. 2021).
3GPP TS 38.300, "3rd Generation Partnership Project; Technical Specification Group Radio Access Network; NR; NR and NG-RAN Overall Description; Stage 2 (Release 16)", V16.5.0 (Mar. 2021).
3GPP TS 38.214, "3rd Generation Partnership Project; Technical Specification Group Radio Access Network; NR; Physical layer procedures for data (Release 16)", V16.5.0 (Mar. 2021).

\* cited by examiner

METHOD AND DEVICE FOR PERFORMING CONFIGURED GRANT-BASED SMALL DATA TRANSMISSION

CROSS-REFERENCE TO RELATED APPLICATION(S)

The present disclosure claims the benefit of and priority to U.S. Provisional Patent Application Ser. No. 63/214,507, filed on Jun. 24, 2021, entitled "BEAM SELECTION FOR SMALL DATA TRANSMISSION PROCEDURE," the content of which is hereby incorporated fully by reference into the present disclosure for all purposes.

FIELD

The present disclosure generally relates to wireless communication and, more particularly, to methods and devices for performing Configured Grant (CG)-based Small Data Transmission (CG-SDT).

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in next-generation wireless communication systems.

SUMMARY

The present disclosure is directed to methods and devices for performing Configured Grant (CG)-based Small Data Transmission (CG-SDT).

According to a first aspect of the present disclosure, a method for a User Equipment (UE) for performing a Configured Grant (CG)-based Small Data Transmission (CG-SDT) is provided. The method includes: receiving a CG-SDT-specific Reference Signal Received Power (RSRP) threshold from a Base Station (BS), the CG-SDT-specific RSRP threshold being configured to the UE for a Synchronization Signal Block (SSB) selection for the CG-SDT; in a case that one or more SSBs with RSRPs above the CG-SDT-specific RSRP threshold are available, performing the SSB selection to determine a first SSB index from one or more SSB indices of the one or more SSBs; and performing an initial transmission of the CG-SDT or a subsequent new transmission of the CG-SDT through a first Uplink (UL) grant corresponding to the first SSB index.

In some implementations of the first aspect of the present disclosure, the method further includes indicating, by a higher layer of the UE, the first SSB index to a lower layer of the UE after determining the first SSB index.

In some implementations of the first aspect of the present disclosure, the method further includes determining, during the SSB selection, a second SSB index for a retransmission of the initial transmission, the second SSB index having a same value as the first SSB index.

In some implementations of the first aspect of the present disclosure, the method further includes indicating, by a higher layer of the UE, the second SSB index to a lower layer of the UE after determining the second SSB index.

In some implementations of the first aspect of the present disclosure, performing the SSB selection includes performing the SSB selection after determining that a configuration for the CG-SDT is configured.

In some implementations of the first aspect of the present disclosure, performing the SSB selection includes performing the SSB selection after determining that a Timing Advance (TA) for the CG-SDT is valid.

In some implementations of the first aspect of the present disclosure, the one or more SSBs are configured for the CG-SDT.

In some implementations of the first aspect of the present disclosure, the CG-specific RSRP threshold is configured through a Small Data Transmission (SDT)-specific CG configuration.

In some implementations of the first aspect of the present disclosure, the SDT-specific CG configuration is configured through a Small Data Transmission (SDT) configuration.

In some implementations of the first aspect of the present disclosure, the SDT configuration is configured through a Radio Resource Control (RRC) release message.

According to a second aspect of the present disclosure, a User Equipment (UE) for performing a Configured Grant based Small Data Transmission (CG-SDT) is provided. The UE includes transmission and reception circuitry and at least one processor coupled to the transmission and reception circuitry. The at least one processor is configured to receive, by the transmission and reception circuitry, a CG-SDT-specific Reference Signal Received Power (RSRP) threshold from a Base Station (BS), the CG-SDT-specific RSRP threshold being configured to the UE for a Synchronization Signal Block (SSB) selection for the CG-SDT; in a case that one or more SSBs with RSRPs above the CG-SDT-specific RSRP threshold are available, perform the SSB selection to determine a first SSB index from one or more SSB indices of the one or more SSBs; and perform an initial transmission of the CG-SDT or a subsequent new transmission of the CG-SDT through a first Uplink (UL) grant corresponding to the first SSB index.

In some implementations of the second aspect of the present disclosure, the at least one processor is further configured to indicate, by a higher layer of the UE, the first SSB index to a lower layer of the UE after determining the first SSB index.

In some implementations of the second aspect of the present disclosure, the at least one processor is further configured to determine, during the SSB selection, a second SSB index for a retransmission of the initial transmission, the second SSB index having a same value as the first SSB index.

In some implementations of the second aspect of the present disclosure, the at least one processor is further configured to indicate, by a higher layer of the UE, the second SSB index to a lower layer of the UE after determining the second SSB index.

In some implementations of the second aspect of the present disclosure, performing the SSB selection includes performing the SSB selection after determining that a configuration for the CG-SDT is configured.

In some implementations of the second aspect of the present disclosure, performing the SSB selection includes performing the SSB selection after determining that a Timing Advance (TA) for the CG-SDT is valid.

In some implementations of the second aspect of the present disclosure, the one or more SSBs are configured for the CG-SDT.

In some implementations of the second aspect of the present disclosure, the CG-specific RSRP threshold is configured through a Small Data Transmission (SDT)-specific CG configuration.

In some implementations of the second aspect of the present disclosure, the SDT-specific CG configuration is configured through a Small Data Transmission (SDT) configuration.

In some implementations of the second aspect of the present disclosure, the SDT configuration is configured through a Radio Resource Control (RRC) release message.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
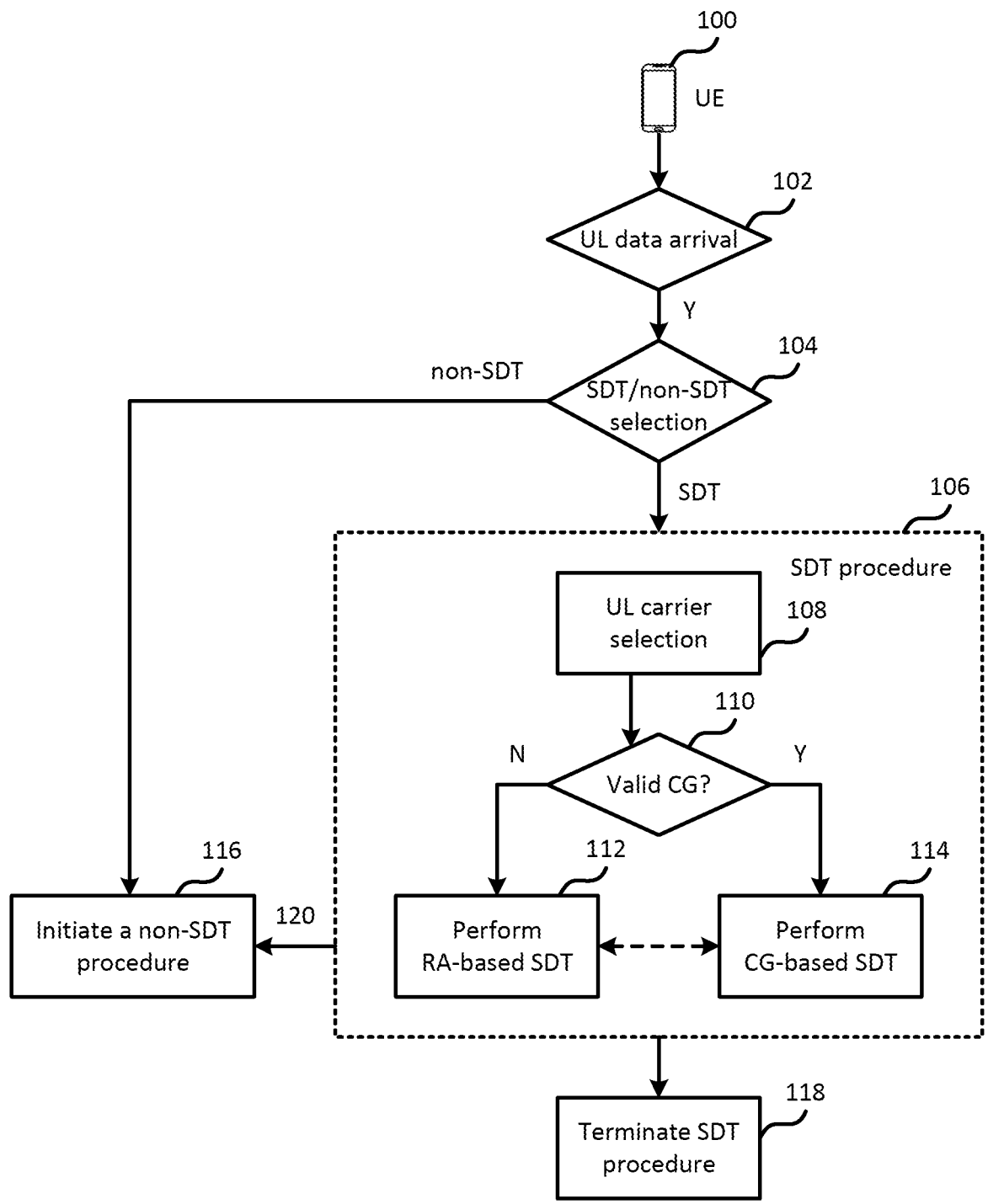
FIG. 1 is a flowchart for performing an SDT-related procedure, according to an example implementation of the present disclosure.

At least some of the acronyms in the present application are defined as follows and, unless otherwise specified, the acronyms have the following meanings:

| Acronym | Full name |
| --- | --- |
| Alt | Alternative |
| ACK | Acknowledge |
| AS | Access Stratum |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |
| CG | Configured Grant |
| CORESET | Control Resource Set |
| C-RNTI | Cell-Radio Network Temporary Identifier |
| CSI | Channel State Information |
| CS-RNTI | Configured Scheduling RNTI |
| CSS | Common Search Space |
| DCI | Downlink Control Information |
| DFI | Downlink Feedback Information |
| DG | Dynamic Grant |
| DL | Downlink |
| DM-RS | Demodulation Reference Signal |
| DRB | Data Radio Bearer |
| DRX | Discontinuous Reception |
| FR | Frequency Range |
| HARQ | Hybrid Automatic Repeat reQuest |
| IE | Information Element |
| LCH | Logical Channel |
| LCP | Logical Channel Prioritization |
| MAC | Medium Access Control |
| MCG | Master Cell Group |
| MPE | Maximum Permissible Exposure |
| MSG | Message |
| NAS | Non-Access Stratum |
| NACK | Non-Acknowledge |
| NR | New Radio |
| NW | Network |
| NUL | Normal Uplink |
| PCell | Primacy Cell |
| PDCCH | Physical Downlink Control Channel |
| PDSCH | Physical Downlink Shared Channel |
| PDU | Protocol Data Unit |
| PHR | Power Headroom Report |
| PHY | Physical Layer |
| PRACH | Physical Random Access Channel |
| PUCCH | Physical Uplink Control Channel |
| PUSCH | Physical Uplink Shared Channel |
| PWS | Public Warning System |
| QCL | Quasi Co Location |
| RA | Random Access |
| RACH | Random Access Channel |
| RAR | Random Access Response |
| RA-SDT | Random Access based Small Data Transmission |
| RA-RNTI | Random Access RNTI |
| Rei | Release |
| RLC | Radio Link Control |
| RNA | RAN Notification Area |
| RNTI | Radio Network Temporary Identifier |
| RO | RACH Occasion |
| RRC | Radio Resource Control |
| RS | Reference Signal |
| RSRP | Reference Signal Received Power |
| Rx | Reception |
| SCell | Secondary Cell |
| SCG | Secondary Cell Group |
| SCS | Subcarrier Spacing |
| SDT | Small Data Transmission |
| SDU | Service Data Unit |
| SI | System Information |
| SIB | System Information Block |
| SPS | Semi-Persistent Scheduling |
| SRB | Singnaling Radio Bearer |
| SR | Scheduling Request |
| SRS | Sounding Reference Signal |
| SS | Search Space |
| SSB | SS/PBCH Block |
| SS-RSRP | Synchronization Signal-RSRP |
| SUL | Supplementary Uplink |
| TA | Time Advance |
| TAT | Timing Alignment Timer |

| Acronym | Full name |
|---|---|
| TCI | Transmission Configuration Indicator |
| TS | Technical Specification |
| Tx | Transmission |
| TBS | Transport Block Size |
| TRP | Transmission and Reception Point |
| UCI | Uplink Control Information |
| UE | User Equipment |
| UL | Uplink |
| USS | UE-specific Search Space |

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "in one example" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UNITS) that is often referred to as 3G based on basic Wideband-Code Division Multiple Access (W-CDMA), High-Speed Packet Access (HSPA), LTE, LTE-A, evolved/enhanced L (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

The terms, definitions, and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

In NR, until Rel-16, the RRC_INACTIVE state doesn't support data transmission. Hence, the UE has to resume the connection (e.g., move to RRC_CONNECTED state) for performing DL reception and/or UL data transmission. Setting up a connection and subsequently releasing to the RRC_INACTIVE state happens for each data transmission regardless of how small and infrequent the data packets are. This results in unnecessary power consumption and signaling overhead. Signaling overhead from RRC_INACTIVE state UEs due to transmission of small data packets is a general problem and will become a critical issue as the number of UEs increases in NR not only for network performance and efficiency but also for the UE's battery performance. In general, devices that have intermittent small data packets in the RRC_INACTIVE state may benefit from enabling small data transmission in the RRC_INACTIVE state. The key enablers for small data transmission in NR, namely the RRC_INACTIVE state, 2-step RACH, 4-step RACH and/or configured grant (CG) type 1 have already been specified as part of legacy. So, this work builds on these building blocks to enable small data transmission in the RRC_INACTIVE state for NR.

Small Data Transmission (SDT) may be a procedure allowing data transmission while the UE is remaining in the RRC_INACTIVE state (e.g., without transitioning to the RRC_CONNECTED state). SDT may be enabled on a radio bearer (RB) basis and is initiated by the UE only if less than a configured amount of UL data awaits transmission across all radio bearers (e.g., SRBs and/or DRBs) for which SDT is enabled and measured RSRP in the cell is above a configured threshold.

SDT may be configured to either take place on RACH (e.g., RA-based SDT) or type 1 CG resources (e.g., CG-based SDT). For CG, the SDT resources may be configured either on an initial BWP or on a dedicated BWP. For RACH, the network also configures whether the 2-step and 4-step RA types can be used. When both can be used, the UE may select the RA type. When only the 2-step RA can be used, SDT may only be initiated if the criteria to select the 2-step RA type are also met.

Once initiated, an SDT procedure lasts as long as the UE is not explicitly directed to the RRC_IDLE state or the RRC_INACTIVE state (via RRCRelease) or to the RRC_CONNECTED state (via RRCResume). When the UE is directed to the RRC_INACTIVE state (via RRCRelease), the UE may stop/terminate the SDT procedure and then move to the normal RRC_INACTIVE state.

After the initial SDT transmission, subsequent (small data) transmissions may be handled differently depending on the type of resources configured. For example, when using CG resources, the network may schedule subsequent UL transmission using dynamic grants. or the subsequent UL transmission may take place on the next CG resource occasions. For example, when using RACH resources, the network may schedule subsequent UL and/or DL transmissions using dynamic grants and/or assignments after the completion of the RA procedure.

FIG. 1 is a flowchart for performing an SDT-related procedure, according to an example implementation of the present disclosure. It should be noted that although actions in FIG. 1 are illustrated as separate actions represented as independent blocks, these separately delineated actions should not be construed as necessarily order dependent. The order in which the actions are performed is not intended to be construed as a limitation, and any number of the disclosed blocks may be combined in any order to implement the method, or an alternate method. Moreover, one or more of the actions may be omitted in some of the present implementations.

The UE 100 may be in the RRC_INACTIVE state. The UE 100 may be configured with configurations for SDT (e.g., via an IE sdt-Config and/or an IE sdt-ConfigCommon). The configurations for SDT may be configured via an RRC release message (and/or via a suspend configuration), and/or via system information (e.g., an SIB). The configuration(s) for SDT may include a RACH configuration, a CG configuration (e.g., via an IE cg-SDT-config), configuration(s) for SRB/DRB used for SDT, a DRB list (e.g., via an IE sdt-DRBList), an SRB indication (e.g., via an IE SRB2Indication), etc.

In action 102, from the UE 100's perspective, UL data may be received (or have arrived) for transmission. The UL data may be associated with a specific DRB/SRB/LCH. The specific DRB/SRB/LCH may be configured for SDT. The specific DRB/SRB/LCH may be configured by a DRB list (e.g., via an IE sdt-DRBList) and/or an SRB indication (e.g., via an IE SRB2Indication). Then a UE may initiate a (RRC resume) procedure for SDT.

In action 104, selection for an SDT procedure (e.g., SDT procedure 106) or a non-SDT procedure (e.g., RRC connection resume procedure) may be performed. For example, the UE 100 (or the MAC entity of the UE 100) may be configured by the RRC layer of the UE 100 with SDT. The SDT procedure may be initiated by the RRC layer. The SDT may be performed through an RA procedure (with a 2-step RA type or with a 4-step RA type), namely, RA-SDT, or through configured grant type 1 (e.g., CG-SDT). For an SDT procedure, the UE 100 (or the MAC entity of the UE 100) may consider that the radio bearers configured with SDT which are suspended for data volume calculation.

The UE 100 may determine whether to initiate an SDT procedure (e.g., an SDT procedure, an RA procedure for SDT (e.g., RA-SDT), and/or an SDT procedure with CG (e.g., CG-SDT)) or a non-SDT procedure (e.g., an RRC connection resume procedure) based on one or more criteria, e.g., including DRB/SRB, data volume, and/or RSRP, etc. In some implementations, the UE 100 may initiate the non-SDT procedure by initiating an RA procedure for the CCCH logical channel.

For example, the UE 100 may initiate the SDT procedure in action 106 when/after at least one LCH/DRB/SRB which is configured for SDT has pending data. For example, data is available for transmission for only those LCHs/DRBs/SRBs for which SDT is enabled. The LCH/DRB/SRB configured for SDT may be resumed/re-established when the UE 100 initiates the SDT procedure in action 106. Otherwise, the UE 100 may initiate the RRC connection resume procedure when/after at least one LCH/DRB/SRB which is not configured for SDT has pending data.

For example, the UE 100 may initiate the SDT procedure in action 106 if the data volume for transmission (e.g., for SDT) is lower than a configured threshold for SDT. The data volume may only count the (total) volume of the LCHs/DRBs/SRBs configured for SDT. Otherwise, the UE 100 may initiate a non-SDT procedure (e.g., an RRC connection resume procedure) if the data volume for transmission (e.g., for SDT) is higher than a configured threshold for SDT.

For example, the UE 100 may initiate the SDT procedure in action 106 if an RSRP is larger than a configured RSRP threshold for SDT. Otherwise, the UE 100 may initiate a non-SDT procedure (e.g., an RRC connection resume procedure) if an RSRP is lower than a configured RSRP threshold for SDT.

There may be two types of SDT procedure: one is based on an RA procedure (e.g., 2-step RA or 4-step RA), e.g., RA-based SDT (or referred to as RA-SDT); the other one is based on CG (e.g., type 1 CG), e.g., CG-based SDT (or referred to as CG-SDT). The UE 100 may perform the RA-based SDT in action 112 or the CG-based SDT in action 114. The UE 100 may transmit the UL data (e.g., small data), via MSG3, MSGA, CG resource, and/or PUSCH resources during the SDT procedure in action 106.

In action 108, the UE 100 may perform UL carrier selection (e.g., if an SUL is configured in the cell, the UL carrier may be selected based on RSRP threshold). After the UL carrier selection, the UE 100 may perform the SDT procedure on the selected UL carrier (e.g., a UL carrier or an SUL carrier). An example of an SDT procedure (such as, but not limited to, the SDT procedure in action 106) is provided in Table 1.

TABLE 1

An example for SDT procedure

AUE/MAC entity may:
1> if the data volume of the pending UL data across all logical channels configured for Small Data Transmission is less than or equal to sdt-DataVolumeThreshold:
2>if the Serving Cell for Small Data Transmission is configured with a supplementary uplink as specified in TS 38.331; and
2> if the RSRP of the downlink pathloss reference is less than sdt-RSRP-ThresholdSSB-SUL:
3> select the SUL carrier.
2>else:
3> select the NUL carrier.
NOTE: FFS the procedure when sdt-RSRP-ThresholdSSB-SUL is not configured
2> if the RSRP of the downlink pathloss reference is higher than sdt-RSRP-Threshold, if configured:
3>if configured grant type 1 is configured for Small Data Transmission, and the configured grant type 1 resource is valid:
4> initiate Small Data Transmission with configured grant type 1 on the selected UL carrier;
4> indicate to the upper layer that conditions for initiating Small Data Transmission are fulfilled.
3>else if Random Access Resources are configured for Small Data Transmission:
4> initiate Random Access procedure on the selected UL carrier for Small Data Transmission;
4> indicate to the upper layer that conditions for initiating Small Data Transmission are fulfilled.
3>else:
4> initiate Random Access procedure for CCCH logical channel (e.g., not for Small Data Transmission);
2>else:
3>initiate Random Access procedure for CCCH logical channel (e.g., not for Small Data Transmission);
1> else:
2>initiate Random Access procedure for CCCH logical channel (e.g., not for Small Data Transmission);

In action 110, the UE 100 whether there is a valid CG. For example, the UE 100 may determine whether a CG resource/configuration is valid (during the SDT procedure) in action 110 based on one or more of the following criteria (1) to (4):

(1) The UE 100 may determine whether a CG resource/configuration is valid based on whether the associated beam is valid. Whether the associated beam is valid may be based on an RSRP threshold. The RSRP threshold may be configured in the RRC release message and/or the CG configuration. For example, if there is at least one beam with RSRP above the RSRP threshold, the UE 100 may consider the CG resource/configuration is valid. If there is no beam with RSRP above the RSRP threshold, the UE 100 may consider the CG resource/configuration is not valid.

(2) The UE 100 may determine whether a CG resource/configuration is valid based on whether a TA is valid. The UE 100 may determine the CG resource/configuration is valid while the TA is valid. If the TA is not valid, the UE 100 may consider the CG resource/configuration is not valid. Whether a TA is valid may be based on a TA timer. For example, the UE 100 may consider the TA is valid while the TA timer is running. The UE 100 may consider the TA is not valid while the TA timer is not running. The (parameter of) TA timer may be configured in the RRC release message and/or the CG configuration. Whether a TA is valid may be based on an RSRP change volume. For example, the UE 100 may consider the TA is not valid if the RSRP change is higher than a threshold. The threshold (for RSRP change) may be configured in the RRC release message and/or the CG configuration. An example of the validation for SDT using CG is provided in Table 2.

TABLE 2

An example of validation for SDT using CG

A UE may consider the time alignment value for Small Data Transmission using configured grant type 1 to be valid when the following conditions are fulfilled:
1> compared to the stored downlink pathloss reference RSRP value, the RSRP has not increased by more than sdt-CG-RSRP-ChangeThresholdIncrease, if configured; and
1> compared to the stored downlink pathloss reference RSRP value, the RSRP has not decrease by more than sdt-CG-RSRP-ChangeThresholdDecrease, if configured (3) The UE 100 may determine whether a CG resource/configuration is valid based on whether a CG configuration is valid. For example, when the CG resource configuration is (re-)initialized, the CG resource configuration may be valid. For example, when the CG resource configuration is released/suspended, the CG resource configuration may be invalid. The CG resource configuration may be configured in the RRC release message.

(4) The UE 100 may determine whether a CG resource/configuration is valid based on whether a timer (e.g., SDT failure detection timer) is running. The timer may be configured in the RRC release message and/or the CG configuration. For example, the UE 100 may determine that the CG resource/configuration is valid while the timer is running. The UE 100 may determine that CG resource/configuration is not valid while the timer is not running or when the timer expires. The timer may be used to detect the failure of the SDT. The timer may be (re-)started upon transmission of UL data when the UE 100 is in the RRC_INACTIVE state. The timer may be (re-)started upon transmission of small data. The timer may be (re-)started upon transmission of an RRC resume request. The timer may be stopped upon reception of an RRCResume, RRCSetup, RRCRelease, RRCRelease with suspendConfig, or an RRCReject message, cell re-selection and upon abortion of connection establishment by upper layers. When the timer expires, the UE 100 may enter the action upon going to the RRC_IDLE state (e.g., with a specific RRC resume cause).

In action 112, if the UE 100 determines that the CG resource/configuration is not valid, e.g., one of the criteria for CG validity is not satisfied, the UE 100 may perform RA-based SDT. For example, the UE 100 may initiate an RA procedure (for SDT). The RA procedure may be either a 2-step type or a 4-step type based on the selection by the UE (e.g., according to an RSRP threshold). The UE 100 may perform the transmission of RA preamble, e.g., via the preamble/RA resource/PRACH resource which is configured for SDT. The UE 100 may perform UL transmission (e.g., small data) via Msg3/MsgA.

In action 114, if the UE 100 determines that the CG is valid, e.g., the criteria for CG validity are satisfied, the UE 100 may perform CG-based SDT. For example, the UE 100 may perform UL transmission (for small data) via CG resource.

In action 116, if the criteria (e.g., DRB/SRB, data volume, and/or RSRP) for initiating the SDT procedure is not satisfied, the UE 100 may initiate a non-SDT procedure (e.g., RRC connection resume procedure), e.g., the UE 100 may initiate an RA procedure for CCCH logical channel.

In action 118, the SDT procedure may be terminated/stopped/completed by an indication from the NW (e.g., via an RRC release message), by a timer (e.g., an SDT failure detection timer expires), and/or by a counter (e.g., the value of the counter reaches a maximum value).

In action 120, the SDT procedure may fallback/switch to the non-SDT procedure (e.g., RRC connection resume procedure). For example, when the UE 100 receives an indication (e.g., fallback indication) from the NW (e.g., an RRC resume/RRC release message), the UE 100 may stop/terminate/complete the SDT procedure in action 106 and then may initiate a non-SDT procedure (e.g., an RRC connection resume procedure) in action 116. In another example, if the initial UL transmission (e.g., in MSGA/MSG3/CG resources) fails a configured number of times, the UE 100 may stop/terminate/complete the SDT procedure and then may initiate an RRC connection resume procedure.

Figure 2:
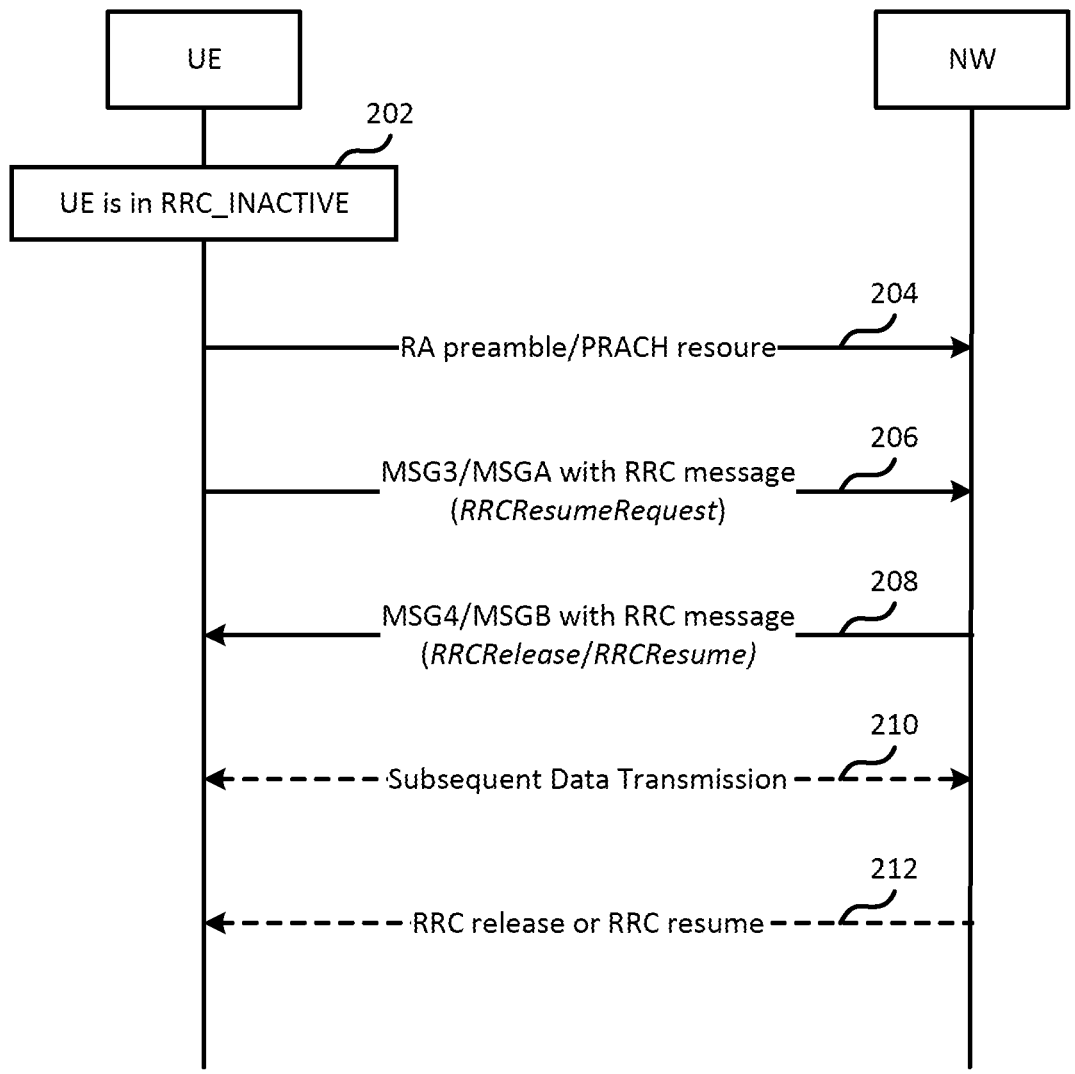
FIG. 2 is a communication diagram that illustrates an RA-based SDT procedure, according to an example implementation of the present disclosure.

FIG. 2 is a communication diagram that illustrates an RA-based SDT procedure, according to an example implementation of the present disclosure.

In action 202, the UE is in the RRC_INACTIVE state.

In action 204, the UE in the RRC_INACTIVE state may transmit an RA preamble/PRACH resource to the network (NW). For example, when the UE in the RRC_INACTIVE state has UL data available for transmission and/or an SDT procedure has been initiated, the UE may initiate an RA-based SDT procedure for the transmission of the UL data (e.g., in a case that the CG is considered as not valid). The UE may select a 4-step RA type or a 2-step RA type. Once the 4-step RA type is selected, a 4-step RA procedure is performed. Once the 2-step RA type is selected, a 2-step RA procedure is performed.

In some implementations, the RA preamble/PRACH resource for the RA-based SDT procedure (e.g., RA preamble/PRACH resource configured for SDT) and that for the normal RA procedure (e.g., RA preamble not configured for SDT) may be different. Here, the UE may select the RA preamble/PRACH resource configured for SDT.

In action 206, after transmitting the RA preamble, the UE may transmit an RRC message (e.g., a CCCH message), MAC CE(s), and/or UL data through MSG3 (when 4-step RA type is selected) or MSGA (when 2-step RA type is selected). The RRC message may be an RRCResumeRequest message. In addition to the RRC message, the MAC CE (e.g., BSR) and the UL data (e.g., data associated with DRB(s) for SDT) may be included in the MSG3/MSGA as well.

In action 208, once the MSG3/MSGA is transmitted, the UE may monitor (Temporary C-RNTI)/C-RNTI/RA-RNTI/MSGB-RNTI for MSG4/MSGB, in which the contention resolution ID will be carried. In an example, the NW may transmit an RRC message in MSG4/MSGB. In another example, the NW may not transmit an RRC message in MSG4/MSGB. If the RRC message is transmitted in MSG4/MSGB, the UE may terminate the SDT procedure, and the UE may not perform action 210 and/or action 212. message may be an RRCRelease message (e.g., with suspendConfig IE), an RRCResume message, etc. The UE may stay in the RRC_INACTIVE state if it receives an RRCRelease message (e.g., with suspendConfig IE) and may enter an RRC_CONNECTED state if the UE receives an RRCResume message, and/or enter the RRC_IDLE state if the UE receives an RRCRelease message (e.g., without suspendConfig IE). If the RRC message is not transmitted in MSG4/MSGB, the UE may keep performing the SDT procedure and may perform the action 210 and/or action 212.

In action 210, once the RA procedure for SDT is successfully completed, the UE may monitor a specific RNTI (e.g., C-RNTI) on a specific search space for subsequent data transmission. Subsequent data transmission may be the transmission of multiple UL and/or DL data packets as part of the SDT procedure and without transitioning to the RRC_CONNECTED state (e.g., the UE is still in the RRC_INACTIVE state). The UE may monitor a PDCCH via a specific RNTI (e.g., C-RNTI) to receive the dynamic scheduling for a new UL and/or DL transmission/and/or a corresponding retransmission. The UE may monitor the PDCCH via a UE specific RNTI (e.g., C-RNTI) to receive the dynamic scheduling for the retransmission of the UL transmission via a CG resource.

In action 212: the NW may send an RRC release message (e.g., with suspendconfig IE) to keep the UE in the RRC_INACTIVE state or move the UE to the RRC_IDLE state by sending an RRC release message. In another example, the NW may send an RRC resume message to move the UE to the RRC_CONNECTED state. Once the RRCRelease message (e.g., with suspendConfig IE) is received, the UE may terminate the SDT procedure based on the RRCRelease message, and/or stop monitoring the C-RNTI, and/or stay in the RRC_INACTIVE state.

Figure 3:
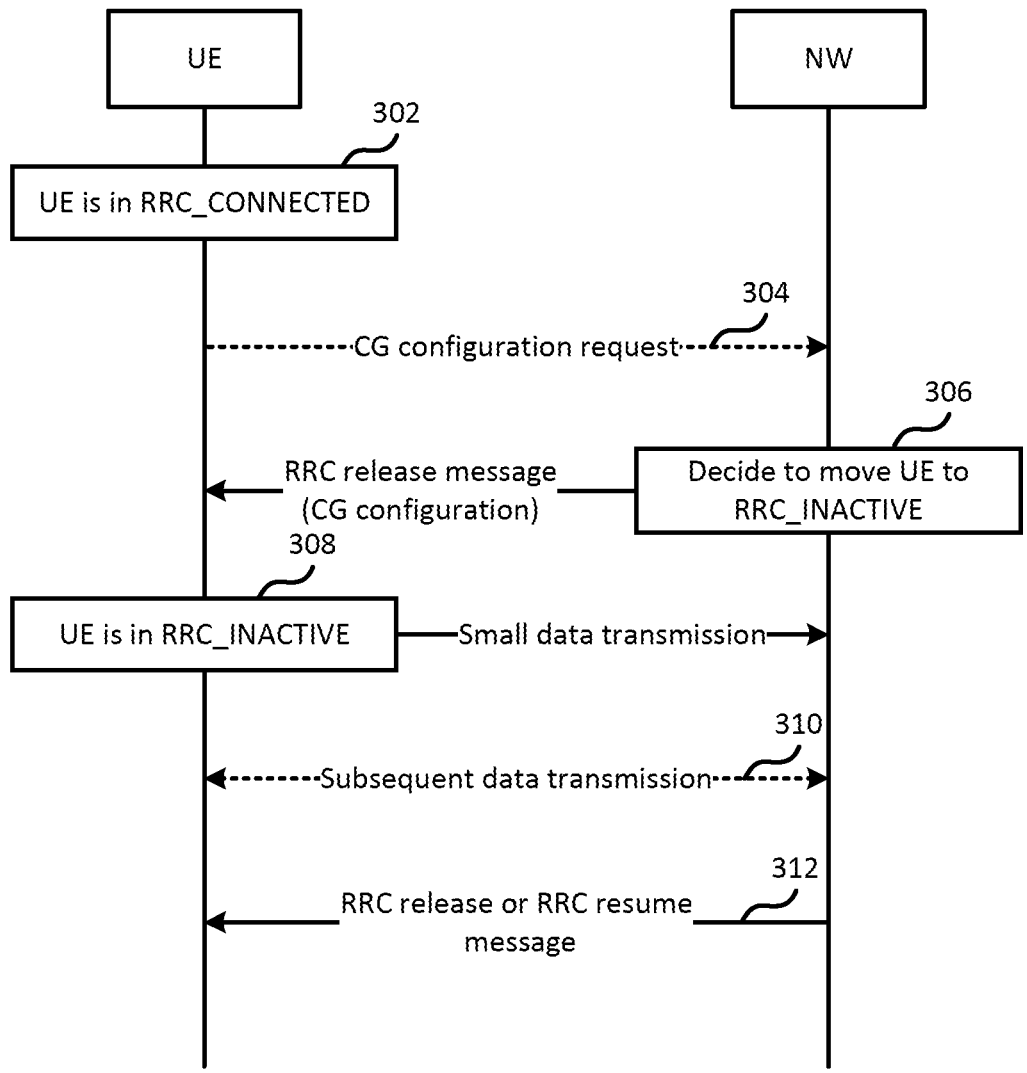
FIG. 3 is a communication diagram that illustrates a CG-based SDT procedure, according to an example implementation of the present disclosure.

FIG. 3 is a communication diagram that illustrates a CG-based SDT procedure, according to an example implementation of the present disclosure.

In action 302, the UE is in the RRC_CONNECTED state.

In action 304, while the UE is in the RRC_CONNECTED state (or the RRC_INACTIVE state), the UE may send a CG configuration request to the NW to indicate the UE's preference on a configuration with CG for small data and/or for the RRC_INACTIVE state.

In action 306, the NW may decide to move the UE to the RRC_INACTIVE state by sending an RRCRelease message (e.g., including suspendconfig IE) to the UE. The RRC release message may include at least a CG configuration to configure the CG resources to the UE. The CG configuration may include, but is not limited to, the following information: CG periodicity, TBS, number for the implicit release of the CG resources, CG Timer, retransmission timer, number of HARQ process reserved for CG in SDT, RSRP threshold for SSB selection and association between SSB and CG resources, TA-related parameters (e.g., cg-SDT-TimeAlignmentTimer), and so on.

In action 308, the UE may perform an SDT procedure based on the CG resources (in the RRC_INACTIVE state) according to the CG configuration (e.g., configured in action 306). For example, the UE may transmit UL data (e.g., small data) via the CG resource (during the SDT procedure).

In action 310, subsequent data transmission may be performed. The subsequent data transmission may be the transmission of multiple UL and/or DL packets as part of the SDT procedure and without transitioning to the RRC_CONNECTED state (e.g., the UE is still in the RRC_INACTIVE state). A UE may monitor a PDCCH via a specific RNTI (e.g., C-RNTI, CS-RNTI, and/or an SDT RNTI) on a search space (e.g., configured by a CG configuration) to receive the dynamic scheduling for UL and/or DL new transmission and/or the corresponding retransmission. The UE may monitor a PDCCH via the specific RNTI to receive the dynamic scheduling for the retransmission of CG. The UE may also perform subsequent data transmission via a CG resource according to the CG configuration (e.g., configured in action 306).

In action 312, the NW may send an RRC release message (with a suspend configuration (suspendconfig) or without suspendconfig) to keep the UE in the RRC_INACTIVE state or move the UE to the RRC_IDLE state. In another example, the NW may send an RRC resume message to move the UE to the RRC_CONNECTED state. Once the RRCRelease message (e.g., with suspendConfig IE) is received, the UE may terminate the SDT procedure based on the RRCRelease message, and/or stop monitoring the specific RNTI, and/or stay in the RRC_INACTIVE state.

Figure 4:
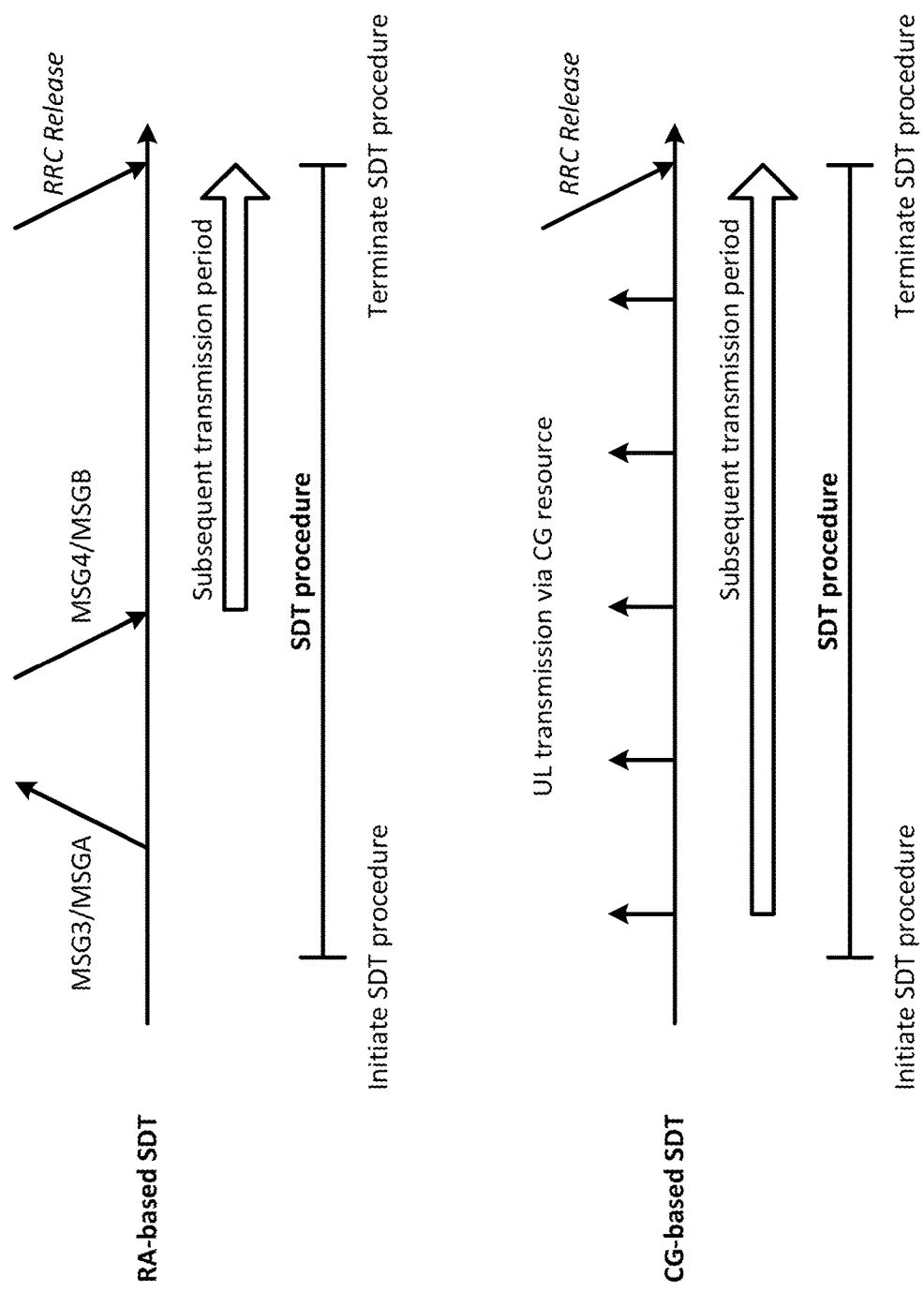
FIG. 4 is a timing diagram that illustrates examples of subsequent transmission periods for an RA-based SDT procedure and a CG-based SDT procedure, according to an example implementation of the present disclosure.

FIG. 4 is a timing diagram that illustrates examples of subsequent transmission periods (or subsequent transmission phases) for an RA-based SDT procedure and a CG-based SDT procedure, according to an example implementation of the present disclosure.

In some implementations, the subsequent transmission period may be determined as a time period during an (RA-based and/or CG-based) SDT procedure. For example, the subsequent transmission period may be a time period while the SDT procedure is ongoing. For example, the subsequent transmission period may be a time period while/after a CG configuration is configured/initiated (and the CG configuration is not released).

In some implementations, the subsequent transmission period may be determined as being started when/after the UE initiates an SDT procedure.

In some implementations, the subsequent transmission period may be determined as being started when/after the UE considers a contention resolution is successful for an RA procedure and/or after the UE considers the RA procedure is successfully completed. The RA procedure may be an RA-based SDT. The RA procedure may be initiated for SDT.

In some implementations, the subsequent transmission period may be determined as being started when/after the CG configuration is configured/(re-)initialized. For example, the CG configuration may contain a parameter which is used to indicate SDT scheduling.

In some implementations, the subsequent transmission period may be determined as being started when/after the CG configuration is considered as valid.

In some implementations, the subsequent transmission period may be determined as being started when/after the UE transmits a UL message. For example, the UL message may be transmitted via MSG1/MSG3/MSGA/CG resource/UL resource scheduled by MSG2/MSGB/MSG4 (during the SDT procedure) or on the UL resource being (pre-)configured as part of an SDT configuration. For example, the UL message may include an RRC resume request message (e.g., RRCResumeRequest, RRCResumeRequest1, and/or a CCCH message for SDT). The UL message may include small data (e.g., UL data associated with a specific SRB/DRB/LCH for SDT). The UL message may include a MAC CE (e.g., BSR MAC CE).

In some implementations, the subsequent transmission period may be determined as being started when/after the UE receives a response from the NW. For example, the response may be a MSG2/MSG4/MSGB and/or a response for a UL transmission via the CG resource. For example, the response may be used for contention resolution, e.g., for an RA procedure. For example, the response may include an (HARQ/RRC) ACK/NACK message, and/or DFI, e.g., for (the first) UL transmission via the CG resource. For example, the response may contain a UL grant/DL assignment for a new transmission/retransmission. The response may be a PDCCH addressed to an RNTI (e.g., a C-RNTI, a CS-RNTI, a dedicated RNTI, an RNTI for SDT, and/or an RNTI for CG). For example, the response may indicate a UL grant for a new transmission for the HARQ process used for the transmission of a UL transmission for small data (e.g., the UL message). For example, the response may include a specific command, e.g., a TA command MAC CE. For example, the response may include RRCResume, RRCSetup, RRCRelease, RRCRelease with SuspendConfig, RRCReestablishment, RRCReconfiguration, and/or RRCReject, etc.

In some implementations, the subsequent transmission period (and/or the SDT procedure) may be terminated/stopped when/after the SDT procedure is terminated.

In some implementations, the subsequent transmission period (and/or the SDT procedure) may be terminated/stopped when/after the CG configuration is released/suspended/cleared.

In some implementations, the subsequent transmission period (and/or the SDT procedure) may be terminated/stopped when/after the CG configuration is considered invalid.

In some implementations, the subsequent transmission period (and/or the SDT procedure) may be terminated/stopped when/after the UE receives an indication from the NW. For example, the indication may include RRCResume (RRC resume message), RRCSetup (RRC setup message), RRCRelease (RRC release message), RRCRelease with SuspendConfig, RRCReestablishment (RRC reestablishment message), and/or RRCReject (RRC reject message), etc. The indication may be a PDCCH addressed to an RNTI (e.g., a C-RNTI, a CS-RNTI, a dedicated RNTI, an RNTI for SDT, and/or an RNTI for CG). The indication may indicate to the UE to terminate the SDT procedure and/or the subsequent transmission period, e.g., based on a field of the indication. The indication may indicate to the UE to initiate an RRC procedure (e.g., RRC connection resume procedure, RRC establishment procedure, and/or RRC reestablishment procedure). The indication may indicate to the UE to switch/fallback the types for SDT, e.g., the types may be RA-based SDT, CG-based SDT, 2-step RA, 4-step RA, etc. The indication (with a specific value, e.g., TRUE or FALSE,) may be included in system information (e.g., SIB) to indicate that CG transmission in the RRC_INACTIVE state is no longer supported in the cell. For example, when the UE receives the indication (with a specific value, e.g., TRUE or FALSE), the UE may release/suspend the CG configuration(s).

In some implementations, the subsequent transmission period (and/or the SDT procedure) may be terminated/stopped when/after a timer expires. For example, the timer may be an SDT failure/problem detection timer. For example, the timer may be specifically configured for SDT. The value of the timer may be configured via an RRC release message. The value of the timer may be configured via the RRC release message with a suspend configuration. The value of the timer may be configured via a configuration for SDT. The value of the timer may be configured via a RACH configuration for SDT. The value of the timer may be configured via a CG configuration for SDT. The value of the timer may be configured via an IE, e.g., UE-TimersAndConstants. The value of the timer may be configured via system information (e.g., a SIB). For example, the timer may be a TA timer, ra-Response Window, msgB-Response Window, ra-ContentionResolutionTimer, configuredGrantTimer, cg-Retransmission Timer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, T345, and/or a new Timer. For example, the timer may be used for monitoring a response (e.g., for ACK/NACK). The timer may include a response window. For example, the timer may be used for receiving a PDCCH/scheduling (e.g., for new transmission or retransmission) from the NW.

In some implementations, the subsequent transmission period may be terminated/stopped when/after the UE enters the RRC_IDLE state or the RRC_CONNECTED state, e.g., from the RRC_INACTIVE state.

In some implementations, the subsequent transmission period may be terminated/stopped/released when/after the UE performs cell selection/reselection.

In some implementations, the subsequent transmission period may be terminated/stopped upon abortion of connection establishment by upper layers.

In some implementations, the subsequent transmission period may be terminated/stopped upon RAN notification area (RNA) update.

In some implementations, the subsequent transmission period may be terminated/stopped when/after the UE establishes/resumes an RRC connection from the RRC_INACTIVE state on a cell that is different from the cell where the CG configuration was provided.

In some implementations, the subsequent transmission period may be terminated/stopped when/after the UE initiates an RRC re-establishment procedure. For example, the subsequent transmission period may be terminated/stopped after the UE sends an RRC reestablishment request (RRCReestablishmentRequest) to the network.

In some implementations, the subsequent transmission period may be terminated/stopped when/after the UE is indicated, by the network, to perform carrier switching (e.g., from an NUL to an SUL or vice versa).

In some implementations, the subsequent transmission period may be terminated/stopped when/after the UE is indicated, by the network, to perform (UL/DL) BWP switching.

In the subsequent transmission period, the UE may need to monitor the PDCCH, e.g., to receive a possible (DL and/or UL) scheduling from the NW. The UE may monitor the PDCCH (during the SDT procedure and/or during the subsequent transmission period) based on a search space, a CORESET, and/or an RNTI. For example, the UE may monitor the PDCCH addressed to the C-RNTI after successful completion of the RA procedure for SDT.

A Search Space (SS) described in the present disclosure may refer to a common search space or a UE-specific search space set.

In some implementations, a common search space may be configured in PDCCH-ConfigCommon. In some implementations, a common search space may include the type-1 PDCCH CSS set configured by ra-SearchSpace. In some implementations, a common search space may include the type-3 PDCCH CSS set. In some implementations, a common search space may refer to search space zero. In some implementations, a common search space may refer to a new common search space set configured via system information (e.g., SIB) or an RRC release message. In some implementations, a common search space may include the search space with parameters of the search space(s) configured in the initial BWP.

In some implementations, a UE-specific search space set may be configured via an RRC release message. In some implementations, a UE-specific search space set may be configured via MSG4/MSGB. In some implementations, a UE-specific search space set may be configured via a PDCCH configuration (PDCCH-Config). In some implementations, a UE-specific search space set may be configured via configuration(s) for SDT. In some implementations, a UE-specific search space set may refer to a search space with an ID besides 0-39. In some implementations, a search space set may be identified as a specific set for SDT.

A CORESET described in the present disclosure may be a common CORESET or a UE-specific CORESET configuration.

In some implementations, a common CORESET may refer to CORESET 0. In some implementations, in some implementations, a common CORESET may be a CORESET besides CORESET 0.

In some implementations, a UE-specific CORESET configuration may refer to a UE-specific CORESET configured via an RRC Release message. In some implementations, a UE-specific CORESET configuration may refer to a UE-specific CORESET configured via MSG4/MSGB. In some implementations, a UE-specific CORESET configuration may refer to a UE-specific CORESET configured via the configuration(s) for SDT. In some implementations, a UE-specific CORESET configuration may refer to a CORESET with ID besides 0-14.

An RNTI described in the present disclosure may refer to a C-RNTI, a CS-RNTI, an RNTI for SDT, an RNTI for CG, a new RNTI other than System Information-RNTI (SI-RNTI), a Radio Network-RNTI (RA-RNTI), an MSGB-RNTI, a Temporary Cell-RNTI (TC-RNTI), a Paging-RNTI (P-RNTI), an Interruption-RNTI (INT-RNTI), a Slot Format Indication-RNTI (SFI-RNTI), a Transmit Power Control-PUSCH-RNTI (TPC-PUSCH-RNTI), a Transmit Power Control-PUCCH-RNTI (TPC-PUCCH-RNTI), a Transmit Power Control-Sounding Reference Symbols-RNTI (TPC-SRS-RNTI), a CI-RNTI, a Modulcation Coding Scheme-Cell-RNTI (MCS-C-RNTI), a CS-RNTI(s), a PS-RNTI, an SL-RNTI, an SL-CS-RNTI, and an SL Semi-Persistent Scheduling V-RNTI.

Examples of some selected terms are provided as follows.

User Equipment (UE): A UE may refer to a PHY/MAC/RLC/PDCP/SDAP/RRC/AS/NAS layer/entity. Conversely, the PHY/MAC/RLC/PDCP/SDAP/RRC/AS/NAS layer/entity may be referred to as the UE.

Network (NW): The NW may be a network node, a TRP, a cell (e.g., SpCell, PCell, PSCell, and/or SCell), an eNB, a gNB, and/or a base station (BS).

Serving Cell: A PCell, a PSCell, or an SCell (Secondary Cell). The serving cell may be an activated or a deactivated serving cell.

Special Cell (SpCell): For Dual Connectivity operation the term Special Cell refers to the PCell of the MCG (Master Cell Group) or the PSCell of the SCG (Secondary Cell Group) depending on if the MAC entity is associated with the MCG or the SCG, respectively. Otherwise, the term Special Cell refers to the PCell.

Moreover, the terms "RA-based SDT" and "RA-SDT", may be interchangeably used in some implementations of the present disclosure. The terms "CG-based SDT" and "CG-SDT", may be interchangeably used in some implementations of the present disclosure. The terms "initiate", "trigger", "apply", "store", "perform" and "start", may be interchangeably used in some implementations of the present disclosure. The terms "terminate", "stop", "release", "suspend", "discard", "end", "complete", "abort", and "cancel", may be interchangeably used in some implementations of the present disclosure. The terms "period", "process", "phase", and "duration" may be interchangeably used in some implementations of the present disclosure. The terms "resource" and "occasion" may be interchangeably used in some implementations of the present disclosure. The terms "ongoing", "running", and "pending" may be interchangeably used in some implementations of the present disclosure. The terms "beam", "SSB", and "CSI-RS" may be interchangeably used in some implementations of the present disclosure.

Beam Selection for RA-SDT

To perform an SDT procedure, the UE may initiate/perform a CG-based SDT procedure or an RA-based SDT procedure (e.g., in a case that the CG for SDT is considered as not valid). The RA-based SDT procedure may refer to an RA procedure that is initiated for SDT. For example, the UE may use/select the RA resources (e.g., PRACH occasions and/or preambles) configured for SDT to transmit the Msg1/MsgA preamble during the RA-based SDT procedure. For the SDT procedure, the UE may initiate only a CBRA procedure without initiating a CFRA procedure. If the UE initiates a (CB)RA procedure, the UE may need to select an SSB based on an RSRP threshold (e.g., rsrp-ThresholdSSB or msgA-RSRP-ThresholdSSB) in the RA resource selection phase. For example, when the UE determines that there is an SSB with SS-RSRP above the RSRP threshold, the UE may use the latest unfiltered L1-RSRP measurement (result). After the UE selects the SSB, the UE may determine the next available PRACH occasions (for Msg1/MsgA preamble transmission) from the (configured) PRACH occasions corresponding to the selected SSB. Then the UE may perform the RA preamble (e.g., Msg1/MsgA) transmission procedure accordingly.

The RA-based SDT procedure may be a specific RA procedure which is initiated for SDT. The reason for initiating the RA-based SDT procedure may be to transmit the small data via Msg3, MsgA via PUSCH, and/or via the UL resources scheduled by CG/DG after the RA procedure is completed during the SDT procedure (e.g., in a subsequent transmission phase). Since the reason for performing an SDT-specific RA procedure may be different from other RA procedures, e.g., that are initiated for other purposes (e.g., initial access, DL or UL data arrival, SR failure, request for other SI, BFR, etc.), the UE's behavior and/or the associated configurations applied for the SDT-specific RA procedure may be different from other RA procedures.

SDT-Specific RSRP Threshold for SSB Selection

Configuration on SDT-Specific RSRP Threshold for SSB Selection

In some implementations, the requirements of the channel quality for an SDT-specific RA procedure may be higher than a normal RA procedure because the payload size of Msg3/MsgA PUSCH for SDT may be larger than the payload size for the normal RA procedure, so the better channel quality may ensure a higher reliability for transmissions. To achieve this, an SDT-specific RSRP threshold for SSB selection (e.g., sdt-RSRP-ThresholdSSB) may be configured to the UE.

For example, the SDT-specific RSRP threshold for SSB selection may be used by the UE to select the (qualified) SSB during the SDT-specific RA procedure. For example, the SDT-specific RSRP threshold for SSB selection may be used by the UE to select the SSB and the corresponding PRACH resource for path-loss estimation and (re)transmission based on the SSB that satisfies the threshold. For example, the SDT- specific RSRP threshold for SSB selection may be explicitly configured for a 2-step RA-SDT procedure or a 4-step RA-SDT procedure. When performing a 2-step RA-SDT procedure, the UE may apply the SDT-specific RSRP threshold for the 2-step RA-SDT procedure for SSB selection. On the other hand, when performing a 4-step RA-SDT procedure, the UE may apply the SDT-specific RSRP threshold for the 4-step RA-SDT procedure for SSB selection.

In some implementations, the SDT-specific RSRP threshold for SSB selection may be configured by a dedicated RRC configuration. In some implementations, the SDT-specific RSRP threshold for SSB selection may be configured by an SDT configuration (e.g., sdt-Config). In some implementations, the UE may receive an RRC message (e.g., RRC release message with suspend configuration) including the SDT configuration. The UE may configure the SDT-specific RSRP threshold for SSB selection after the reception of the RRC message. The SDT-specific RSRP threshold for SSB selection may be configured by an RRC release message (e.g., RRCRelease), and/or a suspend configuration (e.g., SuspendConfig).

In some implementations, the UE may receive the RRC release message including the SDT-specific RSRP threshold for SSB selection. The UE may configure the SDT-specific RSRP threshold for SSB selection after the reception of the RRC release message. In some implementations, the UE may receive an RRC message including the suspend configuration, where the suspend configuration may include the SDT-specific RSRP threshold for SSB selection. The UE may configure the SDT-specific RSRP threshold for SSB selection after the reception of the RRC message.

In some implementations, the SDT-specific RSRP threshold for SSB selection may be configured in an RA configuration for SDT (e.g., RACH-ConfigSDT). For example, the UE may receive an RRC message including the RA configuration for SDT, where the RA configuration for SDT may include the SDT-specific RSRP threshold for SSB selection. The UE may configure the SDT-specific RSRP threshold for SSB selection after the reception of the RRC message. In some implementations, the SDT-specific RSRP threshold for SSB selection may include dedicated parameters for the UE.

In some implementations, the SDT-specific RSRP threshold for SSB selection may be configured by system information (e.g., SIB1 or in 'other SI' in the NR protocols). For example, the SDT-specific RSRP threshold for SSB selection may be configured by a common SDT configuration (e.g., sdt-ConfigCommon). The UE may receive the system information including the SDT-specific RSRP threshold for SSB selection. The UE may configure the SDT-specific RSRP threshold for SSB selection after the reception of the system information.

In some implementations, the SDT-specific RSRP threshold for SSB selection may be configured in a common RA configuration for SDT (e.g., RACH-ConfigCommonSDT). The UE may receive system information including the common RA configuration for SDT, where the common RA configuration for SDT may include the SDT-specific RSRP threshold for SSB selection. The UE may configure the SDT-specific RSRP threshold for SSB selection after the reception of the system information. In some implementations, the SDT-specific RSRP threshold for SSB selection may be a cell-specific parameter.

Absence of an SDT-specific RSRP threshold

In some implementations, an SDT-specific RSRP threshold for SSB selection may be optionally configured by the NW (e.g., the SDT-specific RSRP threshold for SSB selection may not be mandatorily present). In other words, whether to configure the SDT-specific RSRP threshold for SSB selection to the UE or not may depend on the NW's decision. Therefore, in some implementations, the SDT-specific RSRP threshold for SSB selection (e.g., sdt-RSRP-ThresholdSSB) may not be configured by the NW to the UE. For example, the configuration/IE/field for the SDT-specific RSRP threshold for SSB selection may be absent. If the SDT-specific RSRP threshold for SSB selection is not configured, or is absent, the UE may not be allowed to perform SSB selection. Some implementations of the present disclosure provide a mechanism for handling the situation in which the SDT-specific RSRP threshold for SSB selection is not configured, or is absent, at the UE.

In some implementations, if the UE determines that the SDT-specific RSRP threshold for SSB selection is not configured or is absent (e.g., in a first configuration), the UE may apply/use a second RSRP threshold (e.g., configured in a second configuration). Preferably, the UE may select the SSB during the SDT-specific RA procedure based on the second RSRP threshold (e.g., configured in a second configuration).

The first configuration, in some implementations, may be (configured by/in) one or more of the following configurations (1) to (5):
(1) Dedicated SDT configuration (e.g., sdt-Config);
(2) RRC release configuration (e.g., RRCRelease);
(3) Suspend configuration (e.g., SuspendConfig);
(4) RA configuration for SDT (e.g., RACH-ConfigSDT); and
(5) Common RA configuration for SDT (e.g., RACH-ConfigCommonSDT).

In some implementations, the first configuration may include dedicated parameters.

The second configuration, in some implementations, may be (configured by/in) one or more of the following configurations (1) to (5):
(1) Common SDT configuration (e.g., sdt-ConfigCommon);
(2) System information (e.g., SIB1 or in 'other SI' in the NR protocols);
(3) Common RA configuration for SDT (e.g., RACH-ConfigCommonSDT);
(4) RA configurations(s) (e.g., RACH-ConfigCommon, RACH-ConfigGeneric, RACH-ConfigDedicated, RACH-ConfigCommonTwoStepRA, and/or RACH-ConfigGenericTwoStepRA); and
(5) Common BWP UL configuration (e.g., BWP-UplinkCommon).

In some implementations, the second configuration may include common or cell-specific parameters.

In some implementations, the first RSRP threshold for SDT selection may be an SDT-specific RSRP threshold for SSB selection (e.g., sdt-RSRP-ThresholdSSB).

In some implementations, the second RSRP threshold may be one or more of the followings (1) to (5):
(1) rsrp-ThresholdSSB;
(2) msgA-RSRP-ThresholdSSB;
(3) rsrp-ThresholdSSB-SUL;
(4) msgA-RSRP-Threshold; and
(5) a default threshold (e.g., preconfigured to the UE, a fixed value).

SSB Selection for RA-SDT

In some implementations, the SDT-specific RSRP threshold for SSB selection may be used by the UE to determine how to select the SSB during the SDT-specific RA procedure. For example, if the UE determines that the RA procedure is an SDT-specific RA procedure (e.g., RA-SDT procedure), the UE may determine whether at least one of the SSBs is with an SS-RSRP above the SDT-specific RSRP threshold for SSB selection (e.g., sdt-RSRP-ThresholdSSB). Those SSBs with an SS-RSRP above the SDT-specific RSRP threshold may be considered as qualified SSBs for SSB selection.

If at least one of the SSBs is with an SS-RSRP above the SDT-specific RSRP threshold for SSB selection, the UE may select one of the at least one SSB with an SS-RSRP above the SDT-specific RSRP threshold (e.g., one of the qualified SSBs) for SSB selection. That is, for a set of qualified SSBs, the UE may select one of them as the outcome of SSB selection. The MAC layer of the UE may indicate the selected/qualified SSB index (corresponding to the configured uplink grant) to the lower layer (e.g., the PHY layer of the UE).

In some implementations, the UE may determine whether the RA procedure is the SDT-specific RA procedure based on whether the RA procedure is initiated for SDT. In some implementations, the UE may determine whether the RA procedure is the SDT-specific RA procedure based on whether the selected RA type is set to an SDT-specific RA type. For example, if the selected RA type is set to a 4-stepSDT-RA/2-stepSDT-RA, the UE may determine that the RA procedure is an SDT-specific RA procedure. If the selected RA type is set to a 4-stepSDT-RA, a 4-step RA procedure for SDT (or a 4-step RA-based SDT procedure) may be initiated. If the selected RA type is set to a 2-stepSDT-RA, a 2-step RA procedure for SDT (or a 2-step RA-based SDT procedure) may be initiated.

SSB Failure Handling for RA-SDT

It is possible that none of the SSBs is with an SS-RSRP above the SDT-specific RSRP threshold for SSB selection (e.g., when there is no qualified SSB for the UE to select). In some implementations, the UE may select any SSB (e.g., based on the UE implementation) as the outcome of SSB selection, regardless of whether the selected SSB is qualified or not.

In some implementations, if the UE determines that the RA procedure is an SDT-specific RA procedure, the UE may determine whether at least one of the SSBs is with an SS-RSRP above the SDT-specific RSRP threshold for SSB selection (e.g., sdt-RSRP-ThresholdSSB). If the UE determines that none of the SSBs is with an SS-RSRP above the SDT-specific RSRP threshold for SSB selection, the UE may perform one or more of the following actions (1) to (13):

(1) if the UE determines that none of the SSBs is with an SS-RSRP above the SDT-specific RSRP threshold for SSB selection, the UE may select any SSB (e.g., based on the UE implementation).

(2) if the UE determines that none of the SSBs is with an SS-RSRP above the SDT-specific RSRP threshold, the UE may not perform the SSB selection. In this case, the UE may restart performing the RA resource selection procedure. The UE may perform the RA resource selection procedure based on the configured RA- SDT resources with the same type of RA. That is, the UE may re-perform the SSB selection for RA-SDT. In some implementations, the UE may perform an RA resource selection procedure and/or SSB selection for an RA-SDT only after a period of time (e.g., that is configured by the network or preconfigured in the UE). In some implementations, the UE may perform a back off and/or may perform the RA resource selection procedure again after a back off time.

(3) if the UE determines that none of the SSBs is with an SS-RSRP above the SDT-specific RSRP threshold for SSB selection, the UE may select an SSB with the highest RSRP.

(4) if the UE determines that none of the SSBs is with an SS-RSRP above the SDT-specific RSRP threshold for SSB selection, the UE may select a specific SSB (e.g., with a specific SSB index). A specific SSB index may be configured by the NW.

(5) if the UE determines that none of the SSBs is with an SS-RSRP above the SDT-specific RSRP threshold for SSB selection, the UE may select an SSB with the lowest or the highest SSB index, e.g., based on the following order: (i) in an increasing order of DMRS resource indices within a PRACH occasion, where a DMRS resource index is determined first in an ascending order of a DMRS port index and then in an ascending order of a DMRS sequence index, then (ii) in an increasing order of time resource indices for the time multiplexed PRACH occasions, and then (iii) in an increasing order of indices for PRACH occasions across the PRACH periodicities. In some implementations, the UE may first try to select the SSB based on the above described order (i); if the UE cannot determine which SSB to be selected based on the above described order (i), then the UE may try to select the SSB based on the above described order (ii); if the UE still fails to determine which SSB to be selected based on the above described order (ii), then the UE may select the SSB based on the above described order (iii).

(6) if the UE determines that none of the SSBs is with an SS-RSRP above the SDT-specific RSRP threshold for SSB selection, the UE may stop/terminate/abort/cancel the SDT-specific RA procedure.

(7) if the UE determines that none of the SSBs is with an SS-RSRP above the SDT-specific RSRP threshold for SSB selection, the UE may consider that the SDT-specific RA procedure is not successful.

(8) if the UE determines that none of the SSBs is with an SS-RSRP above the SDT-specific RSRP threshold for SSB selection, the UE (e.g., a lower layer of the UE) may indicate to the upper layer that the conditions for initiating an SDT procedure are not fulfilled. For example, the indication to the upper layer may be a failure indication indicating that the SDT-specific RA procedure and/or the SDT procedure has failed to perform.

(9) if the UE determines that none of the SSBs is with an SS-RSRP above the SDT-specific RSRP threshold for SSB selection, the UE may stop/terminate/abort/cancel the SDT procedure.

(10) if the UE determines that none of the SSBs is with an SS-RSRP above the SDT-specific RSRP threshold for SSB selection, the UE may consider that the SDT procedure is not successful.

(11) if the UE determines that none of the SSBs is with an SS-RSRP above the SDT-specific RSRP threshold for SSB selection, the UE may initiate a non-SDT procedure (e.g., an RA procedure for the CCCH logical channel or an RRC connection resume procedure). In some implementations, the UE may consider an SDT failure event has happened when such a condition (e.g., none of the SSBs is with an SS-RSRP above the SDT-specific RSRP threshold) occurs. It should be noted that the UE may determine whether to initiate a non-SDT procedure only when an SDT procedure has not started yet. In some implementations, the UE may not decide to initiate a non-SDT procedure (e.g., even when none of the SSBs is with an SS-RSRP above the SDT-specific RSRP threshold) when the UE has already implemented an active SDT procedure.

(12) if the UE performs a 2-step RA-based SDT procedure and determines that none of the SSBs is with an SS-RSRP above the SDT-specific RSRP threshold for SSB selection for a 2-step RA-based SDT procedure, the UE may initiate a 4-step RA-based SDT procedure.

(13) if the UE performs a 2-step RA-based SDT procedure and determines that none of the SSBs is with an SS-RSRP above the SDT-specific RSRP threshold for SSB selection for a 2-step RA-based SDT procedure, the UE may not increment a corresponding counter (e.g., the PREAMBLE_TRANSMISSION_ COUNTER).

Beam Selection for CG-SDT
Association Between SSBs and CG Resources

To perform SDT in an RRC inactive (RRC_INACTIVE) state, the UE may need to have beam alignment with the network to enable data transmission. In an RA-based SDT, beam alignment with the network may be acquired through an RA procedure, e.g., based on the association between the PRACH resources and the SSBs. For a CG-based SDT, a similar concept as the RA-based procedure may be used, e.g., relying on the association between CG resources and SSBs to acquire the initial beam alignment.

Figure 5:
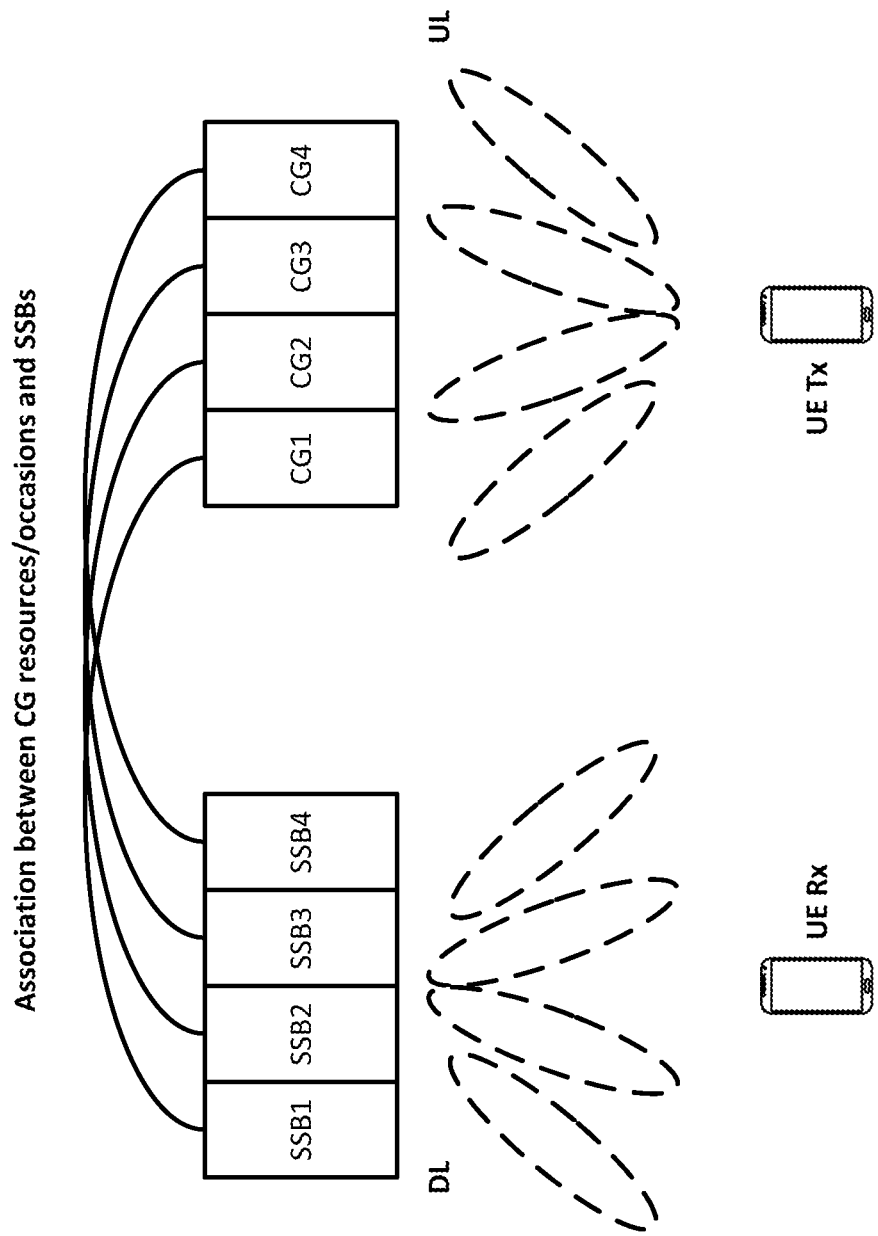
FIG. 5 is a diagram that illustrates the relationship between SSBs and CG resources, according to an example implementation of the present disclosure.

FIG. 5 is a diagram that illustrates the relationship between SSBs and CG resources, according to an example implementation of the present disclosure. As illustrated in FIG. 5, SSB1, SSB2, SSB3 and SSB4 are associated with CG resources CG1, CG2, CG3 and CG4, respectively. Once the association between the SSBs and CG resources has been established (e.g., by the network), the network may know which SSB is selected by the UE according to the associated CG resource that the UE used for the UL transmission. For example, when the network receives a UL transmission which is transmitted by a specific CG resource (e.g., CG1), the NW may be aware of the SSB associated with the specific CG resource (e.g., SSB1) that is selected by the UE based on the association between the SSBs and CG resources. When the UE receives the DL response/feedback for the UL transmission, the UE may consider that it acquires the beam alignment with the network.

In some implementations, the CG resources per CG configuration may be associated with a set of SSB(s) configured by implicit or explicit signaling.

In some implementations, the SSB-to-CG resource mapping within the CG configuration may be implicitly defined. The CG resource may refer to a transmission occasion and a DMRS resource used for the PUSCH transmission.

In some implementations, each consecutive number of N SSB indices (where N may be an integer) provided for a CG configuration may be mapped to the CGPUSCH occasions within the CG configuration in the following order: (i) in an increasing order of DMRS resource indices within a CG PUSCH occasion, where a DMRS resource index is determined first in an ascending order of a DMRS port index and then in an ascending order of a DMRS sequence index, then (ii) in an increasing order of time resource indices for time multiplexed CG PUSCH occasions within a CG periodicity, and then (iii) in an increasing order of indices for CG PUSCH occasions across CG periodicities. In some implementations, the UE may first try to map the N SSB indices based on the above described order (i); if the UE cannot map the N SSB indices based on the above described order (i), then the UE may try to map the N SSB indices based on the above described order (ii); if the UE still fails to determine the N SSB indices based on the above described order (ii), then the UE may map the N SSB indices based on the above described order (iii).

As described above, for an SDT procedure, the UE may initiate/perform a CG-based SDT procedure (e.g., in a case that the CG is considered as valid). For example, if the UE is configured with a CG resource for SDT, and the configured CG resource is valid, the UE may initiate an SDT procedure with CG. For example, the CG-based SDT procedure may be referred to an SDT procedure with CG. For example, the CG may be a CG type 1.

On the other hand, when the UE initiates an SDT procedure with CG (e.g., when the UE determines that the CG is triggered by SDT), the UE may need to select an SSB based on a CG-specific RSRP threshold for SSB selection within the SDT procedure with CG. After the UE selects the SSB, the UE may determine/select the CG resources/configurations associated with the selected SSB. Then the UE may perform the UL transmission via the determined/selected CG resource, accordingly.

For example, when the UE determines that there is an SSB with SS-RSRP above the CG-specific RSRP threshold for SSB selection, the UE may use the latest unfiltered L1-RSRP measurement (result).

CG-Specific RSRP Threshold for SSB Selection
Configuration on CG-Specific RSRP Threshold for SSB Selection In some implementations, a CG-specific RSRP threshold for SSB selection (e.g., cg-SDT-RSRP-ThresholdSSB) may be configured to the UE. The CG-specific RSRP threshold for SSB selection may be used by the UE to select the (qualified) SSB during the SDT procedure with CG (e.g., also referred to as CG-based SDT procedure). The CG-specific RSRP threshold for SSB selection may be used by the UE to select the SSB and a corresponding CG PUSCH resource for path-loss estimation and (re)transmission based on an SSB that satisfies the threshold. The CG-specific RSRP threshold for SSB selection may be configured by a dedicated RRC configuration. For example, the CG-specific RSRP threshold for SSB selection may be configured by an SDT configuration (e.g., sdt-Config). The UE may receive an RRC message (e.g., RRC release message with suspend configuration) including the SDT configuration, which may include the CG-specific RSRP threshold for SSB selection. The UE may configure the CG-specific RSRP threshold for SSB selection after the reception of the RRC message.

The CG-specific RSRP threshold for SSB selection may be configured by an RRC release message (e.g., RRCRelease), and/or a suspend configuration (e.g., Suspend Config). The UE may receive the RRC release (e.g., RRC release message with suspend configuration) message including the CG-specific RSRP threshold for SSB selection. The UE may configure the CG-specific RSRP threshold for SSB selection after the reception of the RRC release message.

The UE may receive an RRC message including the suspend configuration, where the suspend configuration may include the CG-specific RSRP threshold for SSB selection. The UE may configure the CG-specific RSRP threshold for SSB selection after the reception of the RRC message.

The CG-specific RSRP threshold for SSB selection may be configured in a CG configuration for SDT (e.g., cg-SDT-Config). The UE may receive an RRC message including the CG configuration for SDT, which may include the CG-specific RSRP threshold for SSB selection. The UE may configure the CG-specific RSRP threshold for SSB selection after the reception of the RRC message.

The CG-specific RSRP threshold for SSB selection may include dedicated parameters for the UE. The CG-specific RSRP threshold for SSB selection may be configured by system information (e.g., SIB1 or in 'other SI' in the NR protocols). The CG-specific RSRP threshold for SSB selection may be configured by a common SDT configuration (e.g., sdt-ConfigCommon). The UE may receive system information including the CG-specific RSRP threshold for SSB selection. The UE may configure the CG-specific RSRP threshold for SSB selection after the reception of the system information. The CG-specific RSRP threshold for SSB selection may be a cell-specific parameter.

Absence of a CG-Specific RSRP Threshold

The CG-specific RSRP threshold for SSB selection may be optionally configured by the NW (e.g., the CG-specific RSRP threshold for SSB selection may not be mandatorily present). That is, whether to configure the CG-specific RSRP threshold for SSB selection to the UE or not may depend on the NW's decision (e.g., according to the NW implementation). For example, in some scenarios, the CG-specific RSRP threshold for SSB selection (e.g., cg-SDT-RSRP-ThresholdSSB) may not be configured by the NW to the UE. In such scenarios, the configuration/IE/field for the CG-specific RSRP threshold for SSB selection may be absent or not configured at the UE.

In some implementations, if the UE determines that the CG-specific RSRP threshold for SSB selection is not configured or is absent (e.g., in a first configuration), the UE may apply/use a second RSRP threshold (e.g., configured in a second configuration). The UE may select the SSB during the SDT procedure with CG (e.g., CG-based SDT procedure) based on the second RSRP threshold (e.g., configured in a second configuration).

In some implementations, if the UE determines that the CG-specific RSRP threshold for SSB selection is not configured, or is absent in the CG configuration for SDT (e.g., cg-SDT-Config), the UE may apply/use a second RSRP threshold for SSB selection (e.g., rsrp-ThresholdSSB) configured in the RA configuration.

The first configuration, as mentioned above, may be (configured by/in) one or more of the following configurations (1) to (4) in some implementations:
 (1) Dedicated SDT configuration (e.g., sdt-Config);
 (2) RRC release configuration (e.g., RRCRelease);
 (3) Suspend configuration (e.g., SuspendConfig); and
 (4) CG configuration for SDT (e.g., cg-SDT-Config).

In some implementations, the first configuration may include dedicated parameters.

The second configuration, in some implementations, may be (configured by/in) one or more of the following configurations (1) to (6):
 (1) Common SDT configuration (e.g., sdt-ConfigCommon);
 (2) System information (e.g., SIB1 or in 'other SI' in the NR protocols);
 (3) Common RA configuration for SDT (e.g., RACH-ConfigCommonSDT);
 (4) RA configuration for SDT (e.g., RACH-ConfigSDT);
 (5) RA configurations(s) (e.g., RACH-ConfigCommon, RACH-ConfigGeneric, RACH-ConfigDedicated, RACH-ConfigCommonTwoStepRA, and/or RACH-ConfigGenericTwoStepRA); and
 (6) Common BWP UL configuration (e.g., BWP-UplinkCommon).

In some implementations, the second configuration may include common or cell-specific parameters The first RSRP threshold, in some implementations, for SDT selection may be a CG-specific RSRP threshold for SSB selection (e.g., cg-SDT-RSRP-ThresholdSSB) and/or one or more of the followings (1) to (6).
 (1) sdt-RSRP-ThresholdSSB;
 (2) rsrp-ThresholdSSB;
 (3) msgA-RSRP-ThresholdSSB;
 (4) rsrp-ThresholdSSB-SUL;
 (5) msgA-RSRP-Threshold; and
 (6) a default threshold (e.g., preconfigured to the UE, a fixed value).

The second RSRP threshold, in some implementations, may be one or more of the followings (1) to (6):
 (1) sdt-RSRP-ThresholdSSB;
 (2) rsrp-ThresholdSSB;
 (3) msgA-RSRP-ThresholdSSB;
 (4) rsrp-ThresholdSSB-SUL;
 (5) msgA-RSRP-Threshold; and
 (6) a default threshold (e.g., preconfigured to the UE, a fixed value).

In some implementations, if the UE determines that the CG-specific RSRP threshold for SSB selection is not configured or is absent (e.g., in the first configuration), the UE may consider the corresponding CG configuration as invalid. Thereafter, the UE may initiate an RA-based SDT procedure (e.g., on the selected UL carrier) if there is configured PRACH resources for the RA-based SDT procedure (e.g., on the selected UL carrier), and may initiate a non-SDT procedure (e.g., an RA procedure for CCCH logical channel or a RRC connection resume procedure) if there is no configured PRACH resources for the RA-based SDT procedure (e.g., on the selected UL carrier).

SSB Selection for CG-SDT

In some implementations, the CG-specific RSRP threshold for SSB selection may be used by the UE to determine how to select the SSB during the SDT procedure with CG (e.g., CG-based SDT procedure). For example, if the UE determines that the CG is triggered by an SDT, the UE may determine whether at least one of the SSBs is with an SS-RSRP above the CG-specific RSRP threshold for SSB selection (e.g., cg-SDT-RSRP-ThresholdSSB). If at least one of the SSBs is with an SS-RSRP above the CG-specific RSRP threshold for SSB selection, the UE may select an SSB with the SS-RSRP above the CG-specific RSRP threshold (e.g., one of the qualified SSBs).

In some implementations, the UE may determine that the CG is triggered by SDT based on whether the CG is valid and/or configured on the selected carrier (e.g., NUL carrier or SUL carrier).

In some implementations, the UE may determine that the CG is triggered by an SDT based on whether the selected CG type is set to an SDT-specific CG type. For example, if the selected CG type is set to the CG-SDT, the UE may determine that the CG is triggered by the SDT.

Initial Transmission vs. Subsequent Transmissions for CG-SDT

Figure 6:
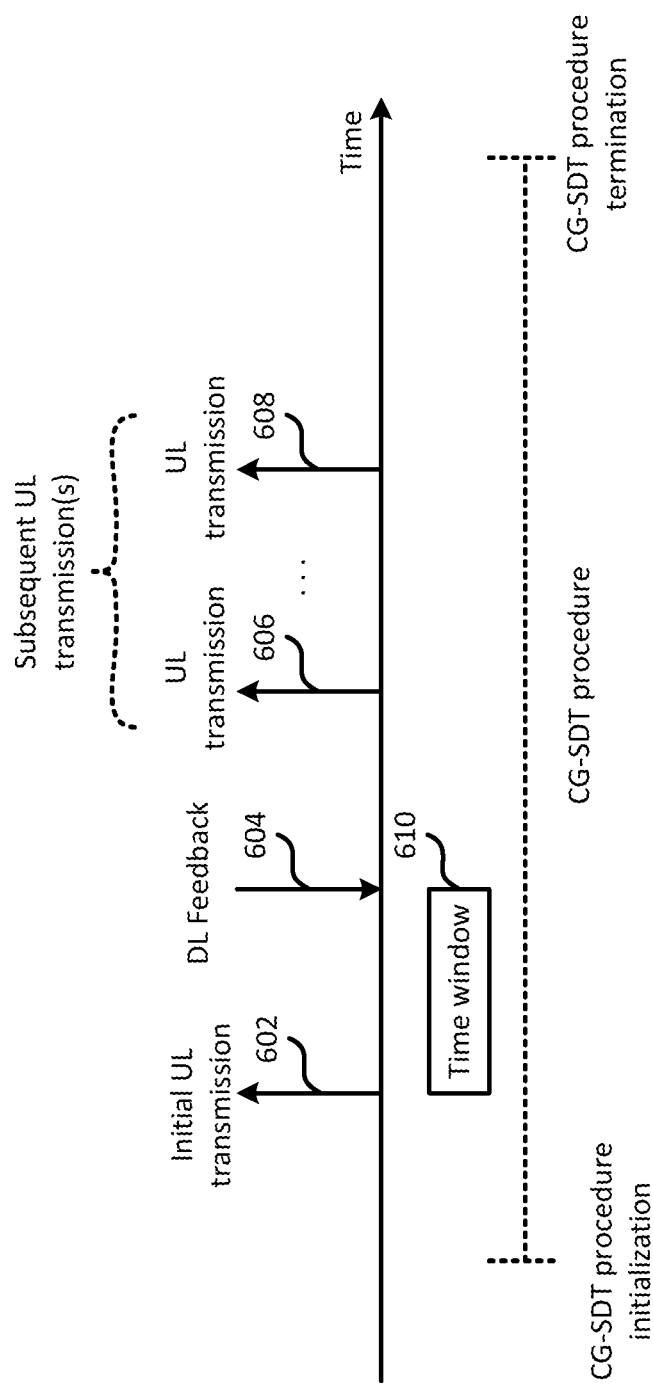
FIG. 6 is a timing diagram that illustrates a CG-SDT procedure, according to an example implementation of the present disclosure.

FIG. 6 is a timing diagram that illustrates a CG-SDT procedure, according to an example implementation of the present disclosure. The CG-SDT procedure may be an SDT procedure with CG transmission(s). When/after the UE initiates the CG-SDT procedure, the UE may perform an initial UL transmission (e.g., a small data transmission) 602 via CG (resource). After the UE performs the initial UL transmission 602, the UE may (re-)start a timer having the time window 610 during which the UE may monitor the PDCCH (e.g., addressed to C-RNTI and/or CS-RNTI) on a specific search space (e.g., configured in the CG configuration for SDT) to receive the DL feedback 604 (e.g., from the NW) for the initial UL transmission 602. After the UE receives the DL feedback 604 which indicates an ACK (e.g., via DFI) or indicates a UL grant for a new transmission on the same HARQ process used for the initial UL transmission, the UE may start performing subsequent UL transmissions (e.g., UL transmissions 606 and 608) via CG or DG scheduled by the NW during the CG-SDT procedure. Although FIG. 6 illustrates only two subsequent UL transmissions 606 and 608, it should be noted that the number of subsequent UL transmission may be arbitrary.

In some implementations, the initial UL transmission of the CG-SDT procedure (e.g., initial UL transmission 602 via CG) may refer to the first UL transmission via CG immediately after the SDT procedure is initiated.

In some implementations, the initial UL transmission of the CG-SDT procedure may be used to transmit one or more of the following (1) to (3):

(1) an RRC resume request message (e.g., RRCResumeRe quest, RRCResumeRequest, and/or a CCCH message for SDT);
(2) small Data (e.g., UL data associated with a specific SRB/DRB/LCH for SDT). The specific SRB may be particularly SRB2; and
(3) a MAC CE (e.g., BSR MAC CE and/or PHR MAC CE).

In some implementations, the initial UL transmission of the CG-SDT procedure may be transmitted via a CG resource which is associated with the selected SSB. In some implementations, the initial UL transmission of the CG-SDT procedure may be the UL transmission which indicates the selected SSB information to the NW. In some implementations, the initial UL transmission of the CG-SDT procedure may be the UL transmission which is transmitted via CG before receiving the DL feedback (e.g., from the NW). In some implementations, the DL feedback from the NW (e.g., the DL feedback 604) for the initial UL transmission may indicate the information of DFI. In some implementations, the DL feedback from the NW for the initial UL transmission may indicate a UL grant for a new transmission on the same HARQ process used for the initial UL transmission. In some implementations, the DL feedback from the NW for the initial UL transmission may indicate an ACK/NACK information.

In some implementations, the subsequent transmissions (e.g., the UL transmissions 606 and 608) may refer to a transmission that is not the initial UL transmission during the CG-SDT procedure. In some implementations, the subsequent transmissions may refer to the transmissions that are performed after the initial UL transmission during the CG-SDT procedure. In some implementations, the subsequent transmissions may refer to the transmissions that are performed after receiving the DL feedback during the CG-SDT procedure. In some implementations, the subsequent transmissions may refer to the transmissions that occur during the subsequent transmission period(s) (e.g., as illustrated in FIG. 4).

The purpose of the initial UL transmission for the CG-SDT procedure, in some implementations, may be to let the NW know that the UE would like to perform the SDT. Therefore, some specific pieces of information, e.g., the RRC resume request message (e.g., RRCResumeRequest, RRCResumeRequest1, and/or a CCCH message for SDT), may need to be transmitted via the initial UL transmission. Furthermore, the (DL) feedback for the initial UL transmission may be used by the NW to confirm that the CG-SDT procedure is allowed to perform. After the UE receives the feedback (e.g., which indicates ACK), the UE may start performing the SDT via the subsequent CG resources and/or the dynamic resources scheduled by the NW during the SDT procedure. In this sense, the purpose of the initial UL transmission for CG-SDT may be different from that of the subsequent transmissions for CG-SDT. Therefore, the UE may apply/perform a corresponding action for each of the initial transmission and the subsequent transmission for CG-SDT. For example, the UE may apply different types of SSB selection for the initial transmission and the subsequent transmission(s). For example, the UE may apply different time windows for PDCCH monitoring for the initial transmission and the subsequent transmission(s). For example, the UE may apply different SSB failure handling procedures for the initial transmission and the subsequent transmission(s). For example, the UE may apply different UE actions on SSB selection for CG-SDT.

Figure 7:
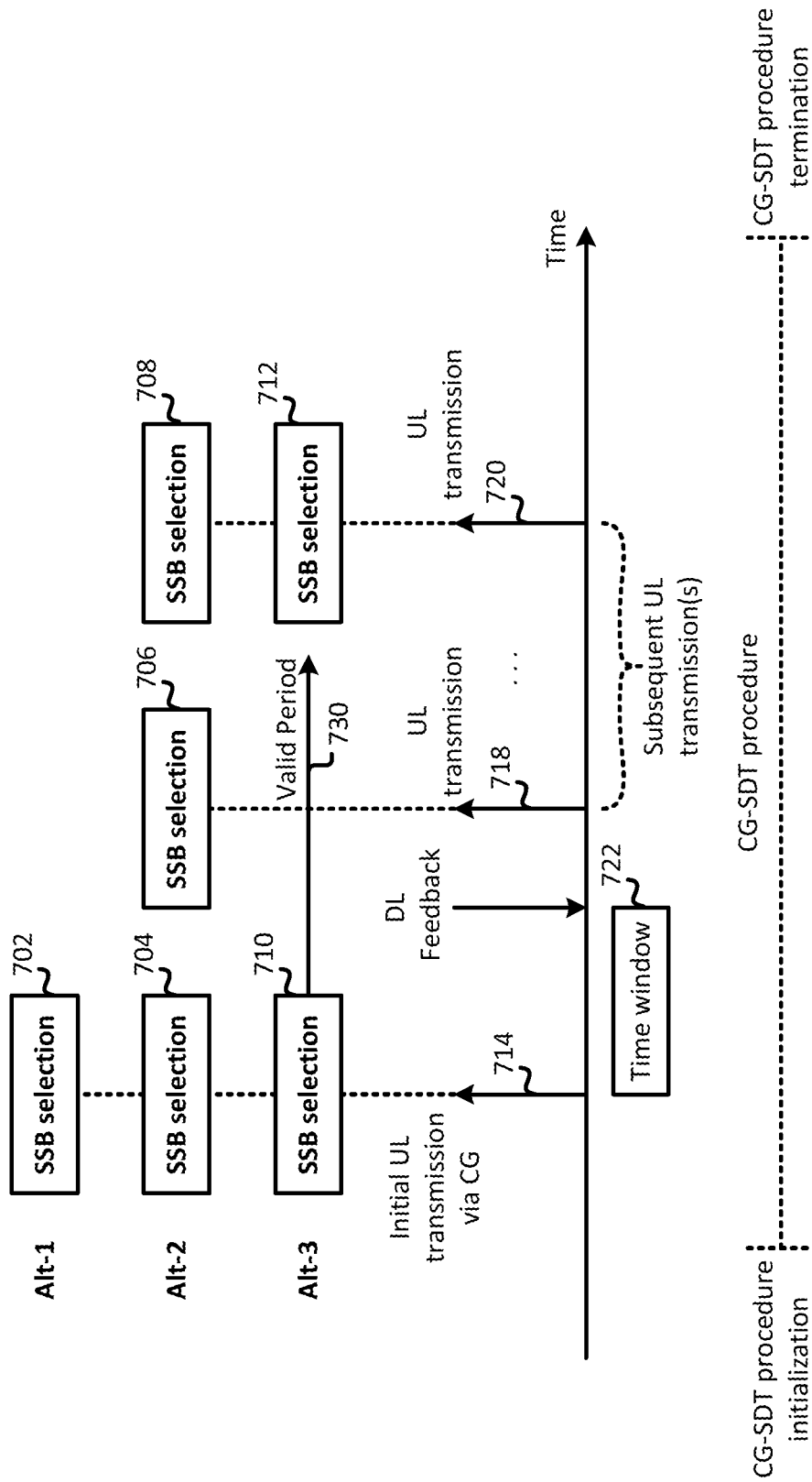
FIG. 7 is a diagram that illustrates different alternatives for the SSB selection performed within a specific time period, according to an example implementation of the present disclosure.

FIG. 7 is a diagram that illustrates different alternatives for the SSB selection performed within a specific time period, according to an example implementation of the present disclosure.

The UE may perform SSB selection for CG-SDT to determine whether at least one of the SSBs with an SS-RSRP above the RSRP threshold for SSB selection is available. The SSBs may be a set of SSBs configured for CG-SDT, e.g., configured in the CG-SDT configuration.

In Alternative-1 (Alt-1), as shown in FIG. 7, the UE may only perform the SSB selection 702 for the initial UL transmission 714 via CG during the CG-SDT procedure. In other words, the UE may not perform other SSB selections for subsequent UL transmissions (e.g., UL transmissions 718 and 720) via CG during the CG-SDT procedure. In addition, the UE may only select a CG resource for performing the subsequent UL transmission(s) via CG if the CG resource is associated with the same SSB as the SSB that the UE selects for the initial UL transmission 714. Although FIG. 7 illustrates only two subsequent UL transmissions 718 and 720, it should be noted that the number of subsequent UL transmissions can be arbitrary.

In some implementations, the UE may only determine/select the CG resources/configurations associated with the selected SSB for the initial UL transmission (e.g., initial UL transmission 714) via CG during the CG-SDT procedure. In other words, the UE may not determine/select the CG resources/configurations associated with the selected SSB for the subsequent transmissions (e.g., UL transmissions 718 and 720) via CG during the CG-SDT procedure.

In some implementations, the UE may only indicate the selected SSB information to the NW via the initial UL transmission (e.g., initial UL transmission 714) via CG during the CG-SDT procedure. In other words, the UE may not indicate the selected SSB information to the NW via the subsequent transmissions (e.g., UL transmissions 718 and 720) via CG during the CG-SDT procedure.

In some implementations, the MAC layer of the UE may indicate the selected SSB index corresponding to the configured uplink grant to the lower layer (e.g., PHY layer) of the UE.

In Alternative-2 (Alt-2), the UE may perform an SSB selection for each UL transmission via CG (e.g., including the initial UL transmission and the subsequent UL transmission(s) right after the initial UL transmission) during the CG-SDT procedure. As illustrated in FIG. 7, the UE may perform the SSB selection 704 for the initial UL transmission 714, and SSB selections 706 and 708 for the subsequent UL transmissions 718 and 720.

In some implementations, the UE may determine/select the CG resources/configurations associated with the selected SSB for each UL transmission via CG (e.g., including the initial UL transmission and the subsequent UL transmission(s)) during the CG-SDT procedure.

In some implementations, the UE may indicate the selected SSB information to the NW via each UL transmission via CG (e.g., including the initial UL transmission and subsequent UL transmissions) during the CG-SDT procedure.

In some implementations, the MAC layer of the UE may indicate the selected SSB index corresponding to the configured uplink grant to the lower layer (e.g., PHY layer) of the UE.

In Alternative-3 (Alt-3), the UE may perform the SSB selection once for a time period (e.g., the valid time period 730 and/or based on a timer/time window) during the CG-SDT procedure. For example, the UE may perform the SSB selection periodically, where the repetition period of performing the SSB selection may be determined based on the valid period 730, a timer and/or within a time window. In some implementations, for each UL transmission that may occur during the CG-SDT procedure, the UE may determine whether to perform an SSB selection for that UL transmission based on a timer (e.g., based on whether the timer is running). For example, during the time period (e.g., the valid period 730) in which the timer is running, the UE may only perform the UL transmission(s) (e.g., SSB selections 710 and 712) on CG resources that correspond to the SSB(s) selected for the time period.

In some implementations, the timer (may also be referred of as beam validity timer or beam prohibit timer) may be used to determine whether the UE should perform an SSB selection for a UL transmission via CG during the CG-SDT procedure. In some implementations, the timer may be used to define a time window (e.g., the time window 722) or any other time window described in the present disclosure.

In some implementations, when the timer is running, the UE may not perform SSB selection(s) during the CG-SDT procedure. For example, when the timer is running, the UE may be prohibited from performing any SSB selection. The UE may perform the SSB selection for a UL transmission (e.g., the initial UL transmission and/or the subsequent UL transmissions) during the CG-SDT procedure only when the timer is not running (e.g., the timer has expired).

In some implementations, the timer may be (re-)started by the UE when the UE performs the SSB selection during the CG-SDT procedure. In some implementations, the timer may be (re-)started by the UE when the UE determines/selects the CG resources/configurations associated with the selected SSB for the initial UL transmission via CG during the CG-SDT procedure. In some implementations, the timer may be (re-)started by the UE when the UE indicates the selected SSB information to the NW via a UL transmission during the CG-SDT procedure. In some implementations, the timer may be (re-)started by the UE when the UE receives an indication from the NW that indicates the beam information (e.g., including SSB, TCI state, etc.). In some implementations, the timer may be stopped/released by the UE when the CG-SDT or the SDT procedure is stopped/terminated/aborted/cancelled/completed. In some implementations, the timer may be stopped/released by the UE when the CG-SDT configuration is released. In some implementations, the timer may be stopped/released by the UE when the SDT configuration is released. In some implementations, the timer may be stopped/released by the UE when the UE does not receive the feedback or receive a NACK information (e.g., via DFI) from the NW. In some implementations, the timer may be stopped/released by the UE when the UE does not receive the UL grant for a new transmission on the same HARQ process used for the previous UL transmission. In some implementations, the timer may be stopped/released by the UE when a time window for receiving the feedback expires (and the UE does not receive the feedback or receiving a NACK (e.g., via DFI) from the NW). In some implementations, the timer may be configured by system information (e.g., via SIM or via 'other SI' in the NR protocols), by an RRC release message, by a suspend configuration in the RRC release message, by a CG configuration for SDT, and/or by an SDT configuration. In some implementations, the timer may be applied/performed by the RRC layer/MAC layer of the UE.

Some other alternatives (e.g., Alternative-4 (Alt-4), Alternative-5 (Alt-5), and Alternative-6 (Alt-6) described as follows), that are not shown in FIG. 7, may also be applicable to the CG-SDT procedure.

In Alt-4, the UE may perform the SSB selection (again) if the UE unsuccessfully transmits a CG resource during the CG-SDT procedure. Under such a scenario, the UE may determine that it has unsuccessfully transmitted a CG resource, for example, when it receives a NACK from the network in response to the transmitted CG resource. For example, the UE may select an SSB that is different from the previously selected SSB.

In some implementations, the NACK may be a UL grant indicating a PUSCH for a retransmission associated with the HARQ process of the transmitted CG resource.

In some implementations, the NACK may be a DFI associated with the HARQ process of the transmitted CG resource.

The UE may consider a NACK from the network for the transmitted CG resource if it does not receive an ACK feedback from the network for a period of time. Under such a scenario, the period of time could be determined by a timer that is configured by the network, e.g., a response timer for CG, configuredGrantTimer, cg-Retransmission Timer, or any other time window described in the present disclosure.

In Alt-5, the UE may or may not perform the SSB selection for each autonomous (re)transmission via a CG resource during the CG-SDT procedure. For example, if the UE fails to transmit on a first CG resource with a first HARQ ID, the UE may perform a (re)transmission autonomously when a second/subsequent CG resource arrives, where the CG timer (e.g., configuredGrantTimer) for the HARQ ID of the CG resource may be running, the CG retransmission timer (e.g., cg-RetransmissionTimer) for the HARQ ID of the CG resource may not be running, and the CG resource may be associated with an SSB with SS-RSRP above the RSRP threshold for SSB selection.

In Alt-6, the UE may or may not perform the SSB selection for each repetition via CG resources or DG resources (e.g., transmissions of a TB within a bundle of the dynamic grant or configured grant) during the CG-SDT procedure. For example, the SSB selected for each transmission of the repetition may be the same. For example, the UE may select different SSBs for different transmissions of the repetition.

In some implementations, the maximum number of transmissions of a TB within a bundle of dynamic grant or configured grant is given by REPETITION_NUMBER:

for a dynamic grant, REPETITION_NUMBER is set to a value provided by lower layers (e.g., as specified in TS 38.214);

for a configured grant, REPETITION_NUMBER is set to a value provided by lower layers (e.g., as specified in TS 38.214).

If REPETITION_NUMBER>1, after the first transmission within a bundle, at most REPETITION_NUMBER−1 HARQ retransmissions may follow within the bundle in some implementations. For both dynamic grant and configured uplink grant, bundling operations may rely on the HARQ entity for invoking the same HARQ process for each transmission that is part of the same bundle. Within a bundle (of the dynamic grant), HARQ retransmissions may be triggered without waiting for a feedback from the previous transmission according to REPETITION_NUMBER for a dynamic grant or configured uplink grant unless they are terminated (e.g., as specified in TS 38.214). Each transmission within a bundle may include a separate uplink grant delivered to the HARQ entity.

In some implementations, for each transmission within a bundle of the dynamic grant, a sequence of redundancy versions may be determined (e.g., according to TS 38.214). For each transmission within a bundle of the configured uplink grant, the sequence of redundancy versions is determined (e.g., according to TS 38.214).

In some implementations, the number of repetitions may be configured by one or more parameters, e.g., repK, repetitionNumber, etc. The parameter(s) may be configured by system information (e.g., SIB1 or by 'other SI' in the NR protocols), by an RRC release message, by a suspend configuration in the RRC release message, by a CG configuration for SDT, and/or by an SDT configuration.

SSB Selection for CG-SDT Based on a Specific Timing/Criteria

In some implementations, the UE may perform the SSB selection for CG-SDT at a specific timing and/or based on one or more criteria.

For example, the UE may perform the SSB selection for CG-SDT to determine whether to initiate a CG-SDT procedure or to initiate an RA-SDT procedure or to initiate a non-SDT procedure. If there is at least one of the SSBs (for CG) with SS-RSRP above the SDT-specific RSRP threshold for SSB selection (for CG), the UE may select an SSB with an SS-RSRP above the SDT-specific RSRP threshold (for CG), and/or the UE may initiate a CG-SDT procedure (e.g., initiate a Small Data Transmission with configured grant type 1). If there is no SSB (for CG) with SS-RSRP above the SDT-specific RSRP threshold for SSB selection (for CG), the UE may initiate an RA-SDT procedure (e.g., if the UE is configured with a PRACH resource for the RA-SDT procedure). For example, the UE may initiate an RA procedure for SDT. If there is no SSB (for CG) with SS-RSRP above the SDT-specific RSRP threshold for SSB selection (for CG), the UE may initiate a non-SDT procedure (e.g., if the UE is not configured with PRACH resource for the RA-SDT procedure). For example, the UE may initiate an RA procedure for a CCCH logical channel (e.g., not for SDT). If there is no SSB (for CG) with SS-RSRP above the SDT-specific RSRP threshold for SSB selection (for CG), the UE may initiate an RRC connection resume procedure.

For example, the UE may perform the SSB selection for CG-SDT after/when the UE determines that the data volume of the pending UL data across all logical channels configured for Small Data Transmission is less or equal than sdt-DataVolumeThreshold.

For example, the UE may perform the SSB selection for CG-SDT after/when the UE selects the NUL or the SUL carrier based on the RSRP threshold for carrier selection. (e.g., sdt-RSRP-ThresholdSSB-SUL).

For example, the UE may perform the SSB selection for CG-SDT after/when the UE determines that the RSRP of the downlink pathloss reference is higher than a RSRP threshold for SDT/non-SDT selection (e.g., sdt-RSRP-Threshold).

For example, the UE may perform the SSB selection for CG-SDT after/when the UE determines that the CG resource for SDT is configured.

For example, the UE may perform the SSB selection for CG-SDT after/when the UE determines that the CG for SDT is valid.

For example, the UE may perform the SSB selection for CG-SDT after/when the UE determines that the TA is valid (e.g., cg-SDT-TimeAlignmentTimer is still running).

For example, the UE may perform the SSB selection for CG-SDT after/when the UE determines that it has available data from specific DRB/SRB/LCH configured for SDT. Moreover, the data may be mapped to at least one of the configured CG configurations.

Different UE actions on time window for CG-SDT

As described above, a time window within a CG-SDT procedure may be used by the UE to monitor the PDCCH (e.g., addressed to C-RNTI and/or CS-RNTI) on a specific search space (e.g., configured in the CG configuration for SDT) to receive the DL feedback (new.g., from the NW) for the previous UL transmission via CG.

For example, when the time window is running, the UE may monitor the PDCCH (e.g., addressed to a C-RNTI and/or a CS-RNTI) on a specific search space (e.g., configured in the CG configuration for SDT). For example, the UE may only monitor the specific search space (e.g., configured in the CG configuration for SDT) and may not monitor other search spaces (e.g., paging search spaces, search spaces for system information, etc.) when the timer window is running.

For example, the time window may be exclusively configured for the SDT (e.g., via sdt-Config). The time window may be configured via an RRC release message. The time window may be configured via a suspend configuration. The time window may be configured via a CG configuration for SDT (e.g., cg-SDT-Config). The time window may be configured via an IE UE-TimersAndConstants. The time window may be configured via system information (e.g., a SIB).

For example, the UE may receive an RRC release message (e.g., RRC release message with suspend configuration) including the configuration for the time window. The UE may be configured based on the configuration for the time window after the reception of the RRC release message.

For example, the UE may receive a suspend configuration including the configuration for the time window. The UE may be configured based on the configuration for the time window after the reception of the suspend configuration.

For example, the UE may receive a CG configuration for SDT including the configuration for the time window. The UE may be configured based on the configuration for the time window after the reception of the CG configuration for SDT.

For example, the UE may receive an IE UE-TimersAndConstants including the configuration for the time window. The UE may be configured based on the configuration for the time window after the reception of the IE UE-TimersAndConstants.

For example, the UE may receive system information including the configuration for the time window. The UE may be configured based on the configuration for the time window after the reception of the system information.

For example, the UE may not start the time window when the UE is configured with the configuration for the time window. The configuration of the time window may (at least) indicate the duration of the time window.

For example, the time window may be a CG-specific (response) time window determined by a timer (e.g., including configuredGrantTimer, cg-RetransmissionTimer, drx-onDurationTimer, drx-InactivityTimer, drx-Retransmission-TimerDL, drx-RetransmissionTimerUL, and/or SDT failure detection timer).

Figure 8:
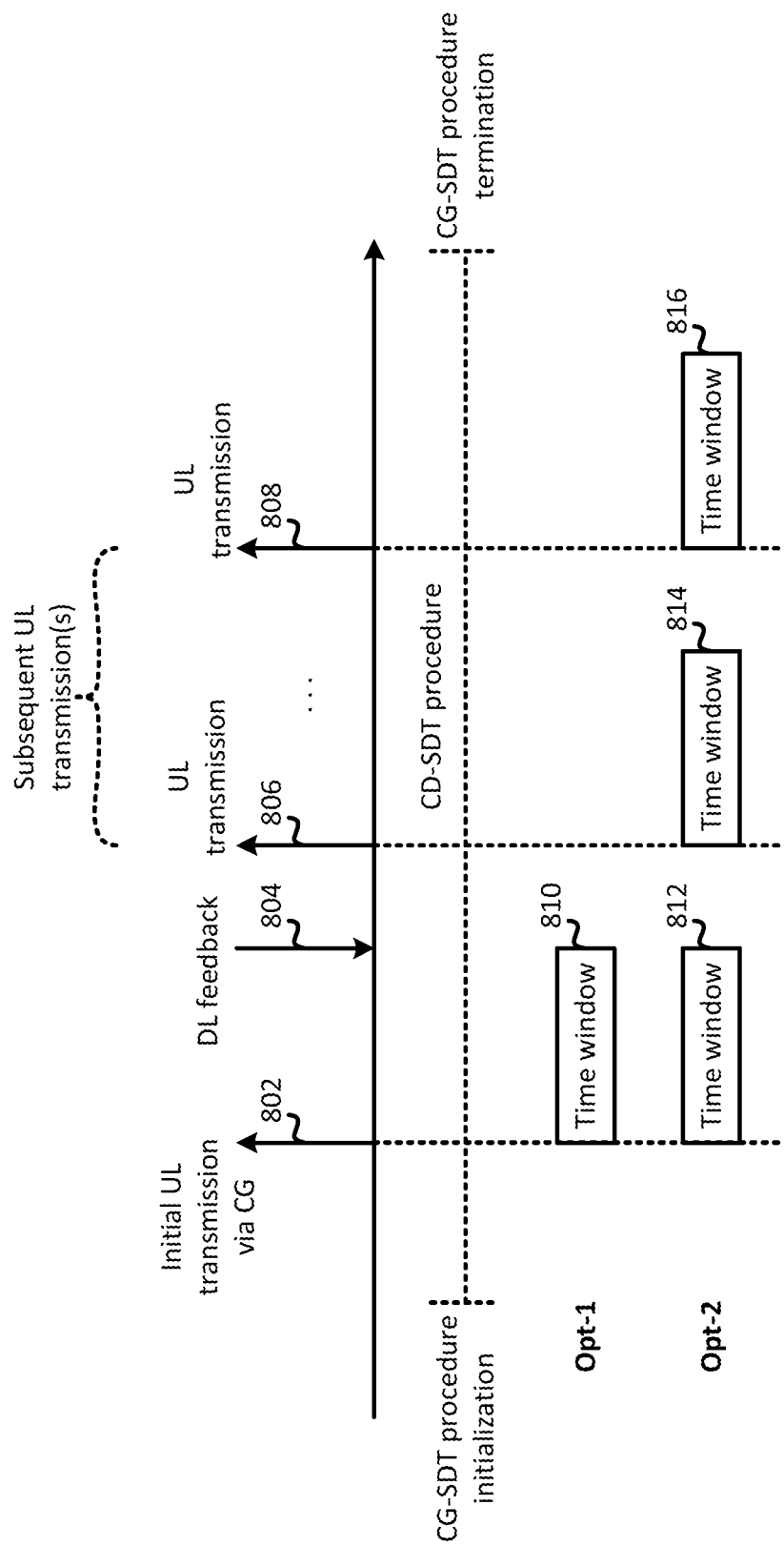
FIG. 8 is a diagram that illustrates different options for a UE to determine whether to (re-)start a time window during a CG-SDT procedure, according to an example implementation of the present disclosure.

FIG. 8 is a diagram that illustrates different options for a UE to determine whether to (re-)start a time window during a CG-SDT procedure, according to an example implementation of the present disclosure. Although FIG. 8 illustrates only two subsequent UL transmissions 806 and 808, it should be noted that the number of subsequent UL transmissions may be arbitrary.

In Option-1 (Opt-1), the UE may only (re-)start the time window 810 for the initial UL transmission 802 via CG during the CG-SDT procedure. Within the time window 810, the UE may monitor the PDCCH to receive the DL feedback 804 for the previous UL transmission via CG (e.g., the initial UL transmission 802) from the NW.

In Opt-1, the UE may not (re-)start the time window 810 for the subsequent UL transmissions (e.g., UL transmissions 806 and 808) via CG that are transmitted after the initial UL transmission during the CG-SDT procedure. For example, the UE may or may not (re-)start the time window for the retransmissions of the initial UL transmission.

In Option-2 (Opt-2), the UE may (re-)start the time window for each UL transmissions via CG (e.g., including the initial UL transmission and the subsequent UL transmission(s) after the initial UL transmission) during the CG-SDT procedure. As illustrated in FIG. 8, the UE may (re-)start the time window 812 for the initial UL transmission 802, the time window 814 for the (subsequent) UL transmission 806, and the time window 816 for the (subsequent) UL transmission 808. Within each time window, the UE may monitor the PDCCU to monitor the DL feedback for the corresponding UL transmission. For example, within the time window 814, the UE may monitor the PDCCU to monitor the DL feedback for the UL transmission 806.

In Opt-2, the UE may or may not (re-)start the time window for the retransmissions of each UL transmission (e.g., including the initial UL transmission and/or the subsequent UL transmission).

Different UE Actions on SSB Failure Handling for CG-SDT

In some cases, it is possible that none of the SSBs is with an SS-RSRP above the CG-specific RSRP threshold for SSB selection. That is, there is no qualified SSB to be selected. For example, when the UE initiates an SDT procedure with CG (e.g., when the UE determines that the CG is triggered by SDT), the UE may determine whether at least one of the SSBs is with an SS-RSRP above the CG-specific RSRP threshold for SSB selection (e.g., cg-SDT-RSRP-Threshold-SSB). If the UE determines that none of the SSBs is with an SS-RSRP above the CG-specific RSRP threshold for SSB selection (e.g., there is no qualified beam/SSB), the UE may need to perform additional actions to handle the SSB failure event.

As discussed above, the purpose of an initial transmission may be different from that of the subsequent transmission(s) during the CG-SDT procedure. Therefore, if the UE determines that none of the SSBs is with an SS-RSRP above the CG-specific RSRP threshold for SSB selection, the UE may preform/apply different operations for the initial transmission and the subsequent transmissions.

Initial (UL) Transmission

In some implementations, if the UE determines that none of the SSBs is with an SS-RSRP above the CG-specific RSRP threshold for SSB selection for the initial transmission of the CG-SDT procedure, the UE may apply/perform a first operation that may include one or more of the following actions (1) to (18):

(1) If the UE determines that none of the SSBs is with an SS-RSRP above the CG-specific RSRP threshold for SSB selection for the initial transmission of the CG-SDT procedure, the UE may select any SSB (e.g., based on the UE implementation).

(2) If the UE determines that none of the SSBs is with an SS-RSRP above the CG-specific RSRP threshold for SSB selection for the initial transmission of the CG-SDT procedure, the UE may not perform the SSB selection.

(3) If the UE determines that none of the SSBs is with an SS-RSRP above the CG-specific RSRP threshold for SSB selection for the initial transmission of the CG-SDT procedure, the UE may select an SSB with highest RSRP.

(4) If the UE determines that none of the SSBs is with an SS-RSRP above the CG-specific RSRP threshold for SSB selection for the initial transmission of the CG-SDT procedure, the UE may select a specific SSB (with a specific SSB index). The specific SSB index may be configured by the NW.

(5) If the UE determines that none of the SSBs is with an SS-RSRP above the CG-specific RSRP threshold for SSB selection for the initial transmission of the CG-SDT procedure, the UE may select an SSB with the lowest or highest SSB index, e.g., based on the following items (i) to (iii): (i) in increasing order of DMRS resource indices within a CG PUSCH occasion, where a DMRS resource index is determined first in an ascending order of a DMRS port index and second in an ascending order of a DMRS sequence index; then (ii) in increasing order of time resource indices for time multiplexed CG PUSCH occasions within a CG periodicity, and then (iii) in increasing order of indices for CG PUSCH occasions across CG periodicities.

(6) If the UE determines that none of the SSBs is with an SS-RSRP above the CG-specific RSRP threshold for SSB selection for the initial transmission of the CG-SDT procedure, the UE may indicate such a condition (e.g., none of the SSBs is qualified) via the initial transmission to NW.

(7) If the UE determines that none of the SSBs is with an SS-RSRP above the CG-specific RSRP threshold for SSB selection for the initial transmission of the CG-SDT procedure, the UE may determine/select any CG resources/configurations for the UL transmission via CG during the CG-SDT procedure.

(8) If the UE determines that none of the SSBs is with an SS-RSRP above the CG-specific RSRP threshold for SSB selection for the initial transmission of the CG-SDT procedure, the UE may determine/select the earliest or latest CG resources (occasion) for the UL transmission via CG during the CG-SDT procedure.

(9) If the UE determines that none of the SSBs is with an SS-RSRP above the CG-specific RSRP threshold for SSB selection for the initial transmission of the CG-SDT procedure, the UE may stop/terminate/abort/cancel the SDT procedure with CG.

(10) If the UE determines that none of the SSBs is with an SS-RSRP above the CG-specific RSRP threshold for SSB selection for the initial transmission of the CG-SDT procedure, the UE may consider the SDT procedure with CG is not successful.

(11) If the UE determines that none of the SSBs is with an SS-RSRP above the CG-specific RSRP threshold for SSB selection for the initial transmission of the CG-SDT procedure, the UE may consider the CG resource for SDT is not valid.

(12) If the UE determines that none of the SSBs is with an SS-RSRP above the SDT-specific RSRP threshold for SSB selection for the initial transmission of the CG-SDT procedure, the UE may indicate to the upper layer that conditions for initiating CG-SDT are not fulfilled. For example, the indication to the upper layer may be a failure indication to indicate that the SDT-specific CG and/or SDT procedure is failed to perform.

(13) If the UE determines that none of the SSBs is with an SS-RSRP above the CG-specific RSRP threshold for SSB selection for the initial transmission of the CG-SDT procedure, the UE may further determine whether any RA resources are configured for SDT.

(14) If the UE determines that none of the SSBs is with an SS-RSRP above the CG-specific RSRP threshold for SSB selection for the initial transmission of the CG-SDT procedure, the UE may initiate an RA-based SDT procedure. For example, the UE may initiate an RA procedure (on the selected UL carrier) for SDT. For example, the UE may only initiate the RA-based SDT procedure if the RA resources are configured for SDT, otherwise, the UE may initiate a non-SDT procedure (e.g., an RA procedure for CCCH logical channel or a RRC connection resume procedure).

(15) If the UE determines that none of the SSBs is with an SS-RSRP above the SDT-specific RSRP threshold for SSB selection for the initial transmission of the CG-SDT procedure, the UE may stop/terminate/abort/cancel the SDT procedure.

(16) If the UE determines that none of the SSBs is with an SS-RSRP above the SDT-specific RSRP threshold for SSB selection for the initial transmission of the CG-SDT procedure, the UE may consider SDT procedure is not successful.

(17) If the UE determines that none of the SSBs is with an SS-RSRP above the SDT-specific RSRP threshold for SSB selection for the initial transmission of the CG-SDT procedure, the UE may initiate a non-SDT procedure (e.g., an RA procedure for CCCH logical channel or an RRC connection resume procedure).

(18) If the UE determines that none of the SSBs is with an SS-RSRP above the CG-specific RSRP threshold for SSB selection for the initial transmission of the CG-SDT procedure, the UE may increment a value of a counter by 1. Under such a scenario, if the value of the counter reaches a maximum value, the UE may initiate an RA-based SDT procedure (e.g., if there is PRACH resources configured for RA-based SDT procedure on the selected UL carrier). Otherwise, the UE may initiate a non-SDT procedure. For example, the UE may initiate an RA procedure (on the selected UL carrier) for SDT. When the value of the counter reaches a maximum value, the UE may initiate a non-SDT procedure (e.g., an RA procedure for CCCH logical channel or an RRC connection resume procedure). The maximum value for the counter may be configured via the CG configuration for SDT.

Subsequent (UL) Transmissions

In some implementations, if the UE determines that none of the SSBs is with an SS-RSRP above the CG-specific RSRP threshold for SSB selection for the subsequent transmissions of the CG-SDT procedure, the UE may apply/perform a second operation which may include one or more of the following actions (1) to (20):

(1) If the UE determines that none of the SSBs is with an SS-RSRP above the CG-specific RSRP threshold for SSB selection for the subsequent transmissions of the CG-SDT procedure, the UE may select any SSB (e.g., based on the UE implementation).

(2) If the UE determines that none of the SSBs is with an SS-RSRP above the CG-specific RSRP threshold for SSB selection for the subsequent transmissions of the CG-SDT procedure, the UE may not perform the SSB selection.

(3) If the UE determines that none of the SSBs is with an SS-RSRP above the CG-specific RSRP threshold for SSB selection for the subsequent transmissions of the CG-SDT procedure, the UE may select an SSB with the highest RSRP.

(4) If the UE determines that none of the SSBs is with an SS-RSRP above the CG-specific RSRP threshold for SSB selection for the subsequent transmissions of the CG-SDT procedure, the UE may select a specific SSB (with a specific SSB index). The specific SSB index may be configured by the NW.

(5) If the UE determines that none of the SSBs is with an SS-RSRP above the CG-specific RSRP threshold for SSB selection for the subsequent transmissions of the CG-SDT procedure, the UE may select the SSB that the UE selects for the initial transmission, if such an SSB exists. If such an SSB does not exist, the UE may apply a second alternative.

(6) If the UE determines that none of the SSBs is with an SS-RSRP above the CG-specific RSRP threshold for SSB selection for the subsequent transmissions of the CG-SDT procedure, the UE may select the previously selected SSB, if such an SSB exists. If such an SSB does not exist, the UE may apply a second alternative.

(7) If the UE determines that none of the SSBs is with an SS-RSRP above the CG-specific RSRP threshold for SSB selection for the subsequent transmissions of the CG-SDT procedure, the UE may select an SSB with the lowest or highest SSB index, e.g., based on the following order (i) to (iii): (i) first, in an increasing order of DMRS resource indices within a CG PUSCH occasion, where a DMRS resource index is determined first in an ascending order of a DMRS port index and then in an ascending order of a DMRS sequence index, then (2) in an increasing order of time resource indices for time multiplexed CG PUSCH occasions within a CG periodicity, and then (iii) in an increasing order of indices for CG PUSCH occasions across CG periodicities.

(8) If the UE determines that none of the SSBs is with an SS-RSRP above the CG-specific RSRP threshold for SSB selection for the subsequent transmissions of the CG-SDT procedure, the UE may indicate such a condition (e.g., none of the SSBs is qualified) via the subsequent transmission to NW.

(9) If the UE determines that none of the SSBs is with an SS-RSRP above the CG-specific RSRP threshold for SSB selection for the subsequent transmissions of the CG-SDT procedure, the UE may determine/select any CG resources/configurations for the UL transmission via CG during the CG-SDT procedure.

(10) If the UE determines that none of the SSBs is with an SS-RSRP above the CG-specific RSRP threshold for SSB selection for the subsequent transmissions of the CG-SDT procedure, the UE may determine/select the earliest or latest CG resources (occasion) for the UL transmission via CG during the CG-SDT procedure.

(11) If the UE determines that none of the SSBs is with an SS-RSRP above the CG-specific RSRP threshold for SSB selection for the subsequent transmissions of the CG-SDT procedure, the UE may stop/terminate/abort/cancel the SDT procedure with CG.

(12) If the UE determines that none of the SSBs is with an SS-RSRP above the CG-specific RSRP threshold for SSB selection for the subsequent transmissions of the CG-SDT procedure, the UE may consider the SDT procedure with CG is not successful.

(13) If the UE determines that none of the SSBs is with an SS-RSRP above the CG-specific RSRP threshold for SSB selection for the subsequent transmissions of the CG-SDT procedure, the UE may consider the CG resource for SDT is not valid.

(14) If the UE determines that none of the SSBs is with an SS-RSRP above the SDT-specific RSRP threshold for SSB selection for the subsequent transmissions of the CG-SDT procedure, the UE may indicate to the upper layer that conditions for initiating CG-SDT are not fulfilled. For example, the indication to the upper layer may be a failure indication to indicate that the SDT-specific CG and/or SDT procedure is failed to perform.

(15) If the UE determines that none of the SSBs is with an SS-RSRP above the CG-specific RSRP threshold for SSB selection for the subsequent transmissions of the CG-SDT procedure, the UE may further determine whether any RA resources are configured for SDT.

(16) If the UE determines that none of the SSBs is with an SS-RSRP above the CG-specific RSRP threshold for SSB selection for the subsequent transmissions of the CG-SDT procedure, the UE may initiate an RA-based SDT procedure. For example, the UE may initiate an RA procedure (on the selected UL carrier) for SDT. For example, the UE may only initiate the RA-based SDT procedure if the RA resources are configured for SDT, otherwise, the UE may initiate a non-SDT procedure (e.g., an RA procedure for CCCH logical channel or a RRC connection resume procedure).

(17) If the UE determines that none of the SSBs is with an SS-RSRP above the SDT-specific RSRP threshold for SSB selection for the subsequent transmissions of the CG-SDT procedure, the UE may stop/terminate/abort/cancel the SDT procedure.

(18) If the UE determines that none of the SSBs is with an SS-RSRP above the SDT-specific RSRP threshold for SSB selection for the subsequent transmissions of the CG-SDT procedure, the UE may consider SDT procedure is not successful.

(19) If the UE determines that none of the SSBs is with an SS-RSRP above the SDT-specific RSRP threshold for SSB selection for the subsequent transmissions of the CG-SDT procedure, the UE may initiate a non-SDT procedure (e.g., an RA procedure for CCCH logical channel or a RRC connection resume procedure).

(20) If the UE determines that none of the SSBs is with an SS-RSRP above the CG-specific RSRP threshold for SSB selection for the subsequent transmissions of the CG-SDT procedure, the UE may increment a value of a counter by 1. When the value of the counter reaches a maximum value, the UE may initiate an RA-based SDT procedure. For example, the UE may initiate an RA procedure (on the selected UL carrier) for SDT. When the value of the counter reaches a maximum value, the UE may initiate a non-SDT procedure (e.g., an RA procedure for CCCH logical channel or a RRC connection resume procedure). The maximum value for the counter may be configured in the CG configuration for SDT.

Assumptions for SDT

SDT may be supported as a baseline for RA-based SDT and CG-based SDT schemes.

A stored "configuration" in the UE Context may be used for the RLC bearer configuration.

The 2-step RACH or 4-step RACH may be applied to RA-based SDT in the RRC_INACTIVE state.

The UL small data may be sent in MSGA of a 2-step RACH and/or MSG3 of a 4-step RACH.

SDT may be configured by the network on a per-RB (e.g., SRB/DRB) basis.

Data volume threshold may be used for the UE to decide whether to perform/select an SDT procedure (e.g., initiate SDT procedure, initiate RA procedure for SDT, and/or initiate SDT procedure with CG) or perform/select a non-SDT procedure (e.g., initiate RA procedure for a CCCH logical channel).

UL/DL transmission following UL SDT without transitioning to the RRC_CONNECTED state (e.g., from the RRC_INACTIVE state) may be applied.

When the UE is in the RRC_INACTIVE state, it may be possible to send one or multiple UL and DL packets as part of the same SDT procedure and without transitioning to the RRC_CONNECTED state (e.g., the UE remains in the RRC_INACTIVE state).

When the UE receives an RRC release message (with suspend configuration), the UE may perform the following actions (1) to (3):

(1) A MAC entity may be reset, and a default radio bearer configuration may be released;
(2) RLC entities for SRB1 may be re-established; and
(3) SRBs and DRBs may be suspended except SRB0.

Upon initiating an SDT procedure (e.g., for the first transmission of small data), the UE may re-establish at least the PDCP entities (for SDT) and/or resume the RBs (for SDT).

The first UL message of SDT (e.g., MSG3 for 4-step RACH, MSGA payload for 2-step RACH and/or the CG transmission) may contain a CCCH message.

LCP may be used to determine the priority of at least one of the following contents (1) to (3) that may be included:

(1) Data from one or more RBs which are configured by the network for small data transmission;
(2) MAC CEs (e.g., BSR, PHR, etc.); and
(3) Padding bits.

The CCCH message may contain ResumeMAC-I generated using the stored security key for RRC integrity protection.

New keys may be generated using the stored security context and the NCC value received in the previous RRC release message, and these new keys may be used for generating the data of RBs that are configured for SDT.

For CG-based SDT, the configuration of CG resources for uplink small data transfer may be contained in the RRC release message.

For CG-based SDT, a TA timer (e.g., cg-SDT-TimeAlignmentTimer) for TA maintenance specified for CG-based small data transfer in the RRC_INACTIVE state may be applied. The TA timer may be configured together with the CG configuration in the RRC release message.

For CG-based SDT, the configuration of CG resources for small data transmission may be valid only in the same serving cell (e.g., the configuration of CG resources for small data transmission may be invalid if the UE camps on another cell).

For CG-based SDT, the UE may use CG-based small data transfer if at least the following criteria (1) to (3) is fulfilled:
 (1) user data is smaller than the data volume threshold;
 (2) CG resources are configured and valid; and
 (3) UE has valid TA.

For CG-based SDT, an association between CG resources and SSBs may be required for CG-based SDT.

For CG-based SDT, an SS-RSRP threshold may be configured for SSB selection. UE selects one of the SSB with SS-RSRP above the threshold and selects the associated CG resources for UL data transmission.

For CG-based SDT, CG-SDT resource configuration may be provided to UEs in the RRC_CONNECTED state by the RRC release message.

For CG-based SDT, CG resources (e.g., PUSCH resources) may be separately configured for NUL and SUL.

For CG-based SDT, an RRC release message may be used to reconfigure or release the CG-SDT configuration/resources while the UE is in the RRC_INACTIVE state.

For CG-based SDT, the subsequent data transmission may use the CG resources or DG (e.g., dynamic grant addressed to UE's C-RNTI/CS-RNTI). The C-RNTI/CS-RNTI may be the same as the previous C-RNTI/CS-RNTI or may be configured explicitly by the network.

For CG-based SDT, a TA timer (e.g., cg-SDT-TimeAlignmentTimer) may be started upon receiving the TA configuration from gNB, e.g., via an RRC release message, and may be (re)started upon reception of a TA command.

For CG-based SDT, the UE may release CG configuration/resources when TAT expires in the RRC_INACTIVE state.

For RA-based SDT, up to two preamble groups (corresponding to two different payload sizes for MSGA/MSG3) may be configured by the network.

For RA-based SDT, upon successful completion of contention resolution, the UE may monitor the C-RNTI.

For RA-based SDT, the RACH resource, e.g., (RO+preamble combination), may be different between SDT (e.g., RA for SDT) and non-SDT (e.g., RA for CCCH or RA for RRC connection resume).

For RA-based SDT, the RRC release (RRCRelease) message may be sent at the end to terminate the SDT procedure (e.g., from RRC point of view). The RRCRelease message sent at the end of the SDT may contain the CG resource.

An RSRP threshold (e.g., sdt-RSRP-Threshold) may be used to select between SDT (e.g., initiate SDT procedure, initiate RA procedure for SDT, and/or initiate SDT procedure with CG) and non-SDT procedure (e.g., initiate RA procedure for CCCH logical channel).

For SDT, the UE may perform UL carrier selection (e.g., UL and SUL selection).

If CG-SDT resources are configured on the selected UL carrier and are valid, then CG-based SDT may be selected to be performed. Otherwise:
 If 2-step RA resources (for SDT) are configured on the UL carrier and criteria to select 2-step RA (for SDT) are met, then 2-step RA type (for SDT) may be chosen,
 else if 4-step RA resources (for SDT) are configured on the UL carrier and criteria to select 4-step RA (for SDT) are met, then 4-step RA type may be chosen,
 else the UE does not perform an SDT procedure (e.g., the UE may perform RRC connection resume procedure).

If both 2-step RA (for SDT) and 4-step RA resources (for SDT) are configured on the UL carrier, RA type selection (e.g., 2-step and 4-step RA type selection) may be performed based on an RSRP threshold (e.g., sdt-MSGA-RSRP-Threshold).

Except for DRB, SRB1 and SRB2 may be configured for SDT, e.g., for carrying RRC and/or NAS messages. Upon initiating an SDT procedure and/or an RRC Resume procedure for SDT initiation (e.g., for first SDT transmission), the UE may also resume an SRB (e.g., SRB1, SRB2, and/or SRB3) that is configured for SDT, e.g., in addition to SDT DRBs that are configured for SDT.

A specific search space may be supported for monitoring the PDCCH addressed to the C-RNTI after successful completion of the RACH procedure during RA-SDT.

An RSRP threshold (e.g., sdt-RSRP-Threshold) may be used to select between an SDT and non-SDT procedure, if configured (RSRP refers to the same RSRP measured for carrier selection).

An RSRP threshold (e.g., sdt-RSRP-Threshold) to select between an SDT and non-SDT procedure may be used for both CG-SDT and RA-SDT.

An RSRP threshold (e.g., sdt-RSRP-Threshold) to select between an SDT and non-SDT procedure may be the same for both CG-SDT and RA-SDT.

An RSRP threshold for carrier selection (e.g., sdt-RSRP-ThresholdSSB-SUL) may be specific to SDT (e.g., separately configured for SDT). This may be optional for the network.

An RSRP threshold for RA type selection (sdt-MSGA-RSRP-Threshold) may be specific to SDT (e.g., separately configured for SDT).

A Data volume threshold (e.g., sdt-DataVolumeThreshold) may be the same for CG-SDT and RA-SDT.

Switching/fallback from an SDT procedure to a non-SDT procedure (e.g., RRC connection resume procedure) may be applied based on some criteria.

Switching/fallback from CG-SDT to RA-SDT may be applied based on some criteria.

UE may switch from an SDT procedure to a non-SDT procedure (e.g., RRC connection resume procedure) in the following scenarios:
 Scenario 1: The UE receives an indication from the network to switch to a non-SDT procedure. For example, Network can send an RRC Resume message, and/or can send an indication in RAR/fallbackRAR/DCI to switch to a non-SDT procedure.
 Scenario 2: Initial UL transmission (in MSGA/MSG3/CG resources) fails up to a configured number of times.

The UE may perform PDCP re-establishment implicitly, e.g., without an explicit indication for PDCP re-establishment from the NW, when the UE initiates an SDT procedure.

SR resources (e.g., PUCCH resources for SR) may not be configured for SDT. When the BSR is triggered by SDT data, the UE will trigger RA because SR resources are not available.

A SDT failure detection timer may be started upon initiation of an SDT procedure.

Upon SDT failure detection timer expiry, the UE may transition to the IDLE state and/or attempt RRC connection setup.

CG resources for SDT may be configured at the same time on NUL and SUL.

The UE may start a timer after an UL (re)transmission, e.g., for CG-SDT.

CG resources for SDT may be configured on BWPs other than an initial BWP.

CG resources per CG configuration may be associated with a set of SSB(s) configured by explicit signaling.

The specific search space may be a common search space to the UEs performing RA-SDT.

A UE-specific search space may be configured for UEs performing CG-SDT.

The UE may monitor paging after the UE initiates SDT for system information change and/or PWS.

For CG-based SDT, the SSB-to-PUSCH resource mapping within the CG configuration may be implicitly defined.

The ordering of the SSB and CG PUSCH resources may be captured in the RAN1 spec (e.g., TS 38.213).

A PUSCH resource may refer to a transmission occasion and a DMRS resource used for PUSCH transmission.

The SSB subset for RSRP based TA validation may be determined at least based on a configured absolute RSRP threshold. The SSB subset may be:
- within a set of SSBs configured per CG configuration,
- within a set of SSBs configured for all CG configurations,
- within a set of all SSBs actually transmitted as indicated in SIB1 or in 'other SI' in the NR protocols, and/or
- the highest N SSBs that are measured to derive the subset for a UE across all CG configurations.

Random Access (RA) Procedure

Two types of RA procedure may be supported: 4-step RA type with MSG1 and 2-step RA type with MS GA. Both types of RA procedure support contention-based random access (CBRA) and contention-free random access (CFRA).

The UE may select the type of random access at initiation of the random access procedure based on network configuration. For example, when CFRA resources are not configured, an RSRP threshold is used by the UE to select between 2-step RA type and 4-step RA type. For example, when CFRA resources for 4-step RA type are configured, the UE performs random access with 4-step RA type. For example, when CFRA resources for 2-step RA type are configured, the UE performs random access with 2-step RA type.

The network may not configure CFRA resources for 4-step and 2-step RA types at the same time for a Bandwidth Part (BWP). CFRA with 2-step RA type is only supported for handover.

The MSG1 of the 4-step RA type may include a preamble on a PRACH. After MSG1 transmission, the UE monitors for a response from the network within a configured window. For CFRA, a dedicated preamble for MSG1 transmission is assigned by the network and upon receiving random access response from the network, the UE ends the random access procedure. For CBRA, upon reception of the random access response, the UE sends MSG3 using the UL grant scheduled in the response and monitors contention resolution. If contention resolution is not successful after MSG3 (re)transmission(s), the UE returns to MSG1 transmission.

The MSGA of the 2-step RA type includes a preamble on a PRACH and a payload on a PUSCH. After MSGA transmission, the UE monitors for a response from the network within a configured window. For CFRA, a dedicated preamble and a PUSCH resource are configured for MSGA transmission and upon receiving the network response, the UE ends the random access procedure. For CBRA, if contention resolution is successful upon receiving the network response, the UE ends the random access procedure; while if a fallback indication is received in MSGB, the UE performs MSG3 transmission using the UL grant scheduled in the fallback indication and monitors contention resolution. If contention resolution is not successful after MSG3 (re)transmission(s), the UE returns to MSGA transmission.

If the random access procedure with 2-step RA type is not completed after a number of MSGA transmissions, the UE can be configured to switch to CBRA with 4-step RA type.

Configured Grant (CG)

With configured grants, the gNB can allocate uplink resources for the initial HARQ transmissions to UEs. Two types of configured uplink grants are defined:
- With Type 1 (e.g., CG type 1), RRC directly provides the configured uplink grant (including the periodicity).
- With Type 2 (e.g., CG type 2), RRC defines the periodicity of the configured uplink grant while a PDCCH addressed to CS-RNTI can either signal and activate the configured uplink grant, or deactivate it; e.g., a PDCCH addressed to CS-RNTI indicates that the uplink grant can be implicitly reused according to the periodicity defined by RRC, until deactivated.

The NW and/or RRC may configure the following parameters (1) to (5) when the CG Type 1 is configured:
(1) cs-RNTI: CS-RNTI for retransmission;
(2) periodicity: periodicity of the configured grant Type 1;
(3) timeDomainOffset: Offset of a resource with respect to SFN=0 in time domain;
(4) timeDomainAllocation: Allocation of configured uplink grant in time domain, which contains startSymbolAndLength (e.g., SLIV in TS 38.214); and
(5) nrofHARQ-Processes: the number of HARQ processes for configured grant.

Upon configuration of a CG Type 1 for a Serving Cell by upper layers, the UE (or MAC entity) may store the uplink grant provided by the upper layers as a configured uplink grant (for the indicated Serving Cell), and/or (re-)initialize the configured uplink grant to start in the symbol according to timeDomainOffset and S (derived from SLIV as specified in TS 38.214), and to reoccur with periodicity.

RRC Connection Resume Procedure

The purpose of the RRC connection resume procedure is to resume a suspended RRC connection, including resuming SRB(s) and DRB(s) or perform an RNA update.

The UE initiates the RRC connection resume procedure when upper layers or AS (when responding to RAN paging, upon triggering RNA updates while the UE is in the RRC_INACTIVE state) requests the resume of a suspended RRC connection.

The suspension of the RRC connection may be initiated by the network. When the RRC connection is suspended, the UE stores the UE Inactive AS context and any configuration received from the network, and transitions to the RRC_INACTIVE state. The RRC message to suspend the RRC connection may be integrity protected and ciphered.

The resumption of a suspended RRC connection may be initiated by upper layers when the UE needs to transition from the RRC_INACTIVE state to the RRC_CONNECTED state or by RRC layer to perform an RNA update or by RAN paging from NG-RAN. When the RRC connection is resumed, the network configures the UE according to the RRC connection resume procedure based on the stored UE Inactive AS context and any RRC configuration received from the network. The RRC connection resume procedure re-activates AS security and re-establishes SRB(s) and DRB(s).

In response to a request to resume the RRC connection, the network may resume the suspended RRC connection and send UE to the RRC_CONNECTED state or reject the request to resume and send the UE to the RRC_INACTIVE state (with a wait timer), or directly re-suspend the RRC connection and send the UE to the RRC_INACTIVE state, or directly release the RRC connection and send the UE to the RRC_IDLE state, or instruct the UE to initiate NAS-level recovery (in this case, the network sends an RRC setup message).

The details of the RRC connection resume procedure can be found in 3GPP TS 38.331 V16.4.1.

Figure 9:
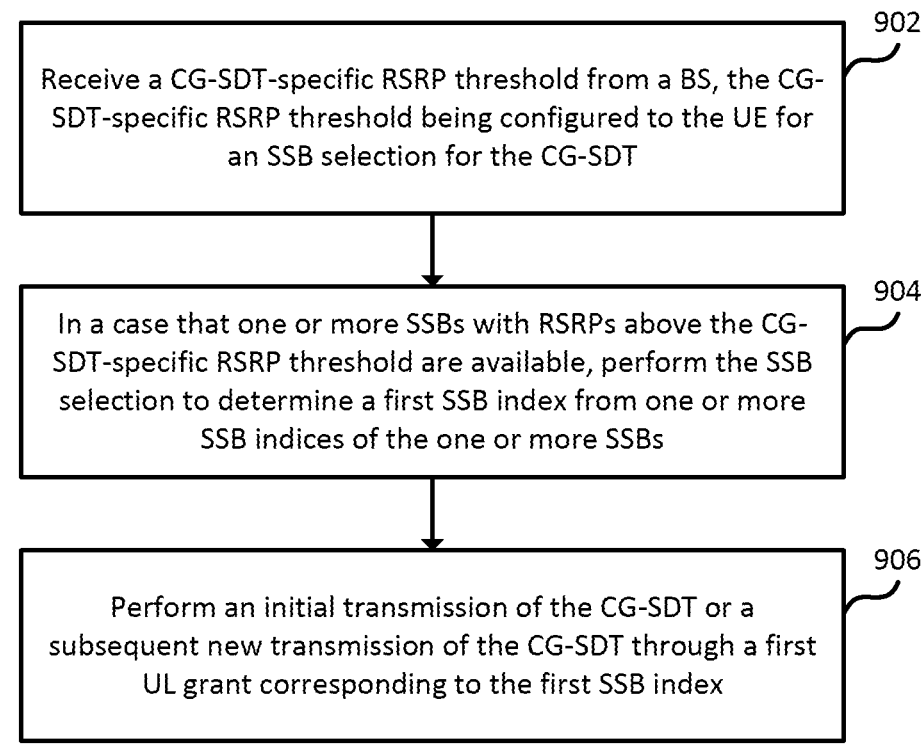
FIG. 9 is a flowchart for performing a CG-SDT procedure by a UE, according to an example implementation of the present disclosure.

FIG. 9 is a flowchart for performing a CG-SDT procedure by a UE, according to an example implementation of the present disclosure. Although actions 902, 904, and 906 are illustrated as separate actions represented as independent blocks in FIG. 9, these separately illustrated actions should not be construed as necessarily order-dependent. The order in which the actions are performed in FIG. 9 is not intended to be construed as a limitation, and any number of the disclosed blocks may be combined in any order to implement the method, or an alternate method. Moreover, each of actions 902, 904, and 906 may be performed independently of other actions, and can be omitted in some implementations of the present disclosure.

In action 902, the UE may receive a CG-SDT-specific RSRP threshold from a BS. The CG-SDT-specific RSRP threshold may be configured to the UE for an SSB selection for the CG-SDT. For example, the UE may use the configured CG-SDT-specific RSRP threshold as a lcriterion for selecting a qualified SSB when performing the SSB selection.

In action 904, in a case that one or more SSBs with RSRPs above the CG-SDT-specific RSRP threshold are available, the UE may perform the SSB selection to determine a first SSB index from one or more SSB indices of the one or more SSBs.

For example, the UE may consider a set of SSBs having RSRSs that are greater than the CG-SDT-specific RSRP threshold as qualified SSBs. If the UE finds that one or more qualified SSBs (with each having a corresponding SSB index) are available, the UE may select one of the qualified SSBs as an outcome of the SSB selection by determining the SSB index (e.g., the first SSB index) of the selected qualified SSB.

In action 906, the UE may perform an initial transmission of the CG-SDT or a subsequent (new) transmission of the CG-SDT through a first UL grant corresponding to (or associated with) the first SSB index. The initial transmission of the CG-SDT may refer to an initial UL transmission (e.g., via a CG resource), as described in the present disclosure. The subsequent (new) transmission of the CG-SDT may refer to a subsequent UL transmission that is after the initial UL transmission, where such a subsequent UL transmission is a new (UL) transmission instead of a retransmission of the initial transmission.

In some implementations, the higher layer of the UE (e.g., the MAC layer or above) may indicate the first SSB index to a lower layer (e.g., the PHY layer) of the UE after determining the first SSB index.

In some implementations, the UE may determine, during the SSB selection, a second SSB index for a retransmission of the initial transmission, the second SSB index having a same value as the first SSB index.

In some implementations, the higher layer of the UE (e.g., the MAC layer or above) may indicate the second SSB index to a lower layer (e.g., the PHY layer) of the UE after the UE determines the second SSB index.

In some implementations, performing the SSB selection may include performing the SSB selection after the UE determines that a configuration for the CG-SDT is configured.

In some implementations, performing the SSB selection may include performing the SSB selection after the UE determines that a TA for the CG-SDT is valid.

In some implementations, the one or more SSBs (or qualified SSB(s)) are configured for the CG-SDT. For example, the one or more SSBs may be contained in a set of radio resources that are exclusively configured by the BS for the CG-SDT (procedure).

In some implementations, the CG-specific RSRP threshold may be configured through an SDT-specific CG configuration.

In some implementations, the SDT-specific CG configuration may be configured through an SDT configuration.

In some implementations, the SDT configuration may be configured through an RRC release message.

According to method 900, the UE may be able to perform an SDT procedure (e.g., CG-SDT) more efficiently and perform UL/DL transmission with higher reliability during the SDT procedure. If the UE is in an RRC Inactive state, the BS may not exactly know the DL channel condition of the UE (e.g., since there is no SSB or DL channel's report). Based on the association between the SSBs and CG resources which has been established/configured (e.g., by the BS), the BS may know which SSB is selected by the UE according to the associated CG resource that the UE used for the UL transmission. With such a mechanism, the performance of beam alignment is improved, thereby enhancing the efficiency and reliability of SDT communications and/or the UL/DL transmissions during the SDT procedure.

Figure 10:
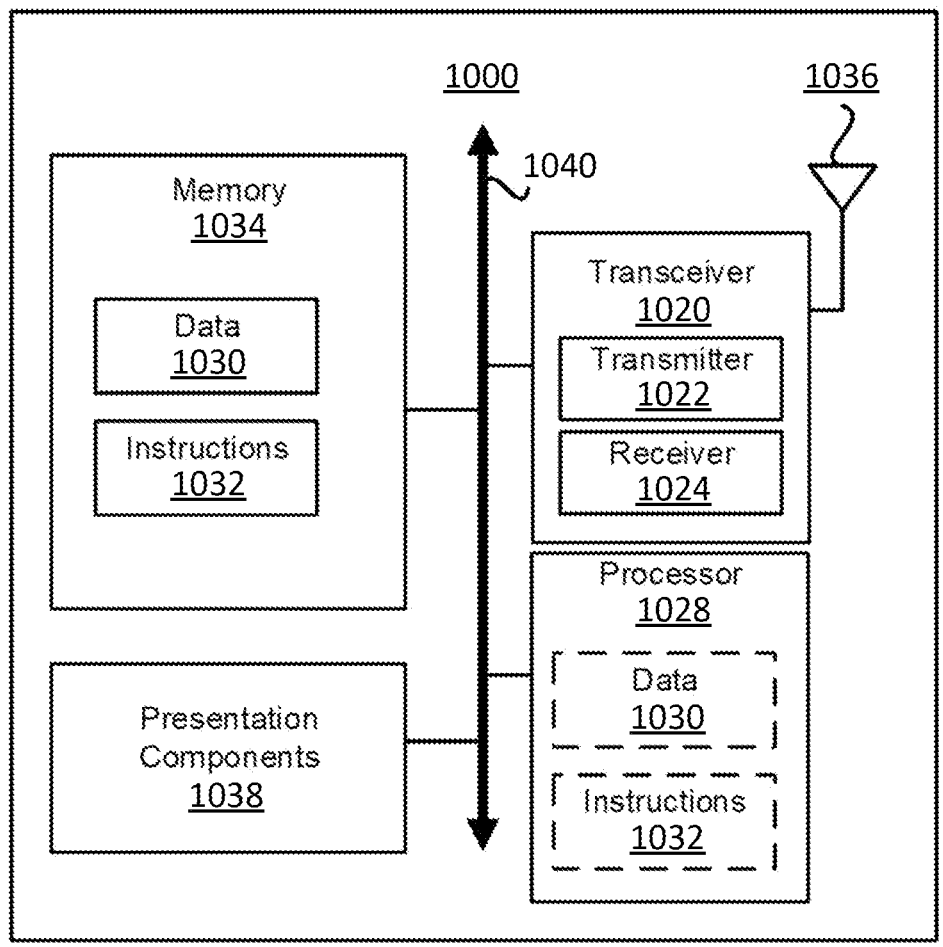
FIG. 10 is a block diagram illustrating a node for wireless communication, according to an example implementation of the present disclosure.

FIG. 10 is a block diagram illustrating a node 1000 for wireless communication, according to an example implementation of the present disclosure. As illustrated in FIG. 10, a node 1000 may include a transceiver 1020, a processor 1028, a memory 1034, one or more presentation components 1038, and at least one antenna 1036. The node 1000 may also include a radio frequency (RF) spectrum band module, a BS communications module, a network communications module, and a system communications management module, Input/Output (I/O) ports, I/O components, and a power supply (not illustrated in FIG. 10).

Each of the components may directly or indirectly communicate with each other over one or more buses 1040. The node 1000 may be a UE or a BS that performs various functions disclosed with reference to FIGS. 1 through 9.

The transceiver 1020 has a transmitter 1022 (e.g., transmitting/transmission circuitry) and a receiver 1024 (e.g., receiving/reception circuitry) and may be configured to transmit and/or receive time and/or frequency resource partitioning information. The transceiver 1020 may be configured to transmit in different types of subframes and slots including, but not limited to, usable, non-usable and flexibly usable subframes and slot formats. The transceiver 1020 may be configured to receive data and control channels.

The node 1000 may include a variety of computer-readable media. Computer-readable media may be any available media that may be accessed by the node 1000 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 1034 may include computer-storage media in the form of volatile and/or non-volatile memory. The memory 1034 may be removable, non-removable, or a combination thereof. Example memory may include solid-state memory, hard drives, optical-disc drives, etc. As illustrated in FIG. 10, the memory 1034 may store a computer-readable and/or computer-executable program 1032 (e.g., software codes or a set of instructions) that are configured to, when executed, cause the processor 1028 to perform various functions disclosed herein, for example, with reference to FIGS. 1 through 9. Alternatively, the program 1032 may not be directly executable by the processor 1028 but may be configured to cause the node 1000 (e.g., when compiled and executed) to perform various functions disclosed herein.

The processor 1028 (e.g., having processing circuitry) may include an intelligent hardware device, e.g., a Central Processing Unit (CPU), a microcontroller, an ASIC, etc. The processor 1028 may include memory. The processor 1028 may process the data 1030 and the program 1032 received from the memory 1038, and information transmitted and received via the transceiver 1020, the baseband communications module, and/or the network communications module. The processor 1028 may also process information to send to the transceiver 1020 for transmission via the antenna 1036 to the network communications module for transmission to a Core Network (CN).

One or more presentation components 1038 may present data indications to a person or another device. Examples of presentation components 1038 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method for a User Equipment (UE) for performing a Configured Grant (CG)-based Small Data Transmission (CG-SDT), the method comprising:
   receiving a CG-SDT-specific Reference Signal Received Power (RSRP) threshold from a Base Station (BS), the CG-SDT-specific RSRP threshold being configured to the UE for a Synchronization Signal Block (SSB) selection for the CG-SDT;
   in a case that one or more SSBs with RSRPs above the CG-SDT-specific RSRP threshold are available, performing the SSB selection to determine a first SSB index from one or more SSB indices of the one or more SSBs; and
   performing an initial transmission of the CG-SDT or a subsequent new transmission of the CG-SDT through a first Uplink (UL) grant corresponding to the first SSB index.

2. The method of claim 1, further comprising:
   indicating, by a higher layer of the UE, the first SSB index to a lower layer of the UE after determining the first SSB index.

3. The method of claim 1, further comprising:
   determining, during the SSB selection, a second SSB index for a retransmission of the initial transmission, the second SSB index having a same value as the first SSB index.

4. The method of claim 3, further comprising:
   indicating, by a higher layer of the UE, the second SSB index to a lower layer of the UE after determining the second SSB index.

5. The method of claim 1, wherein performing the SSB selection comprises performing the SSB selection after determining that a configuration for the CG-SDT is configured.

6. The method of claim 1, wherein performing the SSB selection comprises performing the SSB selection after determining that a Timing Advance (TA) for the CG-SDT is valid.

7. The method of claim 1, wherein the one or more SSBs are configured for the CG-SDT.

8. The method of claim 1, wherein the CG-specific RSRP threshold is configured through a Small Data Transmission (SDT)-specific CG configuration.

9. The method of claim 8, wherein the SDT-specific CG configuration is configured through a Small Data Transmission (SDT) configuration.

10. The method of claim 9, wherein the SDT configuration is configured through a Radio Resource Control (RRC) release message.

11. A User Equipment (UE) for performing a Configured Grant (CG)-based Small Data Transmission (CG-SDT), the UE comprising:
    transmission and reception circuitry; and
    at least one processor coupled to the transmission and reception circuitry and configured to:
      receive, by the transmission and reception circuitry, a CG-SDT-specific Reference Signal Received Power (RSRP) threshold from a Base Station (BS), the CG-SDT-specific RSRP threshold being configured to the UE for a Synchronization Signal Block (SSB) selection for the CG-SDT;
      in a case that one or more SSBs with RSRPs above the CG-SDT-specific RSRP threshold are available, perform the SSB selection to determine a first SSB index from one or more SSB indices of the one or more SSBs; and perform an initial transmission of the CG-SDT or a subsequent new transmission of the CG-SDT through a first Uplink (UL) grant corresponding to the first SSB index.

12. The UE of claim 11, wherein the at least one processor is further configured to:
   indicate, by a higher layer of the UE, the first SSB index to a lower layer of the UE after the UE determines the first SSB index.

13. The UE of claim 11, wherein the at least one processor is further configured to:
   determine, during the SSB selection, a second SSB index for a retransmission of the initial transmission, the second SSB index having a same value as the first SSB index.

14. The UE of claim 13, wherein the at least one processor is further configured to:
   indicate, by a higher layer of the UE, the second SSB index to a lower layer of the UE after determining the second SSB index.

15. The UE of claim 11, wherein performing the SSB selection comprises performing the SSB selection after determining that a configuration for the CG-SDT is configured.

16. The UE of claim 11, wherein performing the SSB selection comprises performing the SSB selection after determining that a Timing Advance (TA) for the CG-SDT is valid.

17. The UE of claim 11, wherein the one or more SSBs are configured for the CG-SDT.

18. The UE of claim 11, wherein the CG-specific RSRP threshold is configured through a Small Data Transmission (SDT)-specific CG configuration.

19. The UE of claim 18, wherein the SDT-specific CG configuration is configured through a Small Data Transmission (SDT) configuration.

20. The UE of claim 19, wherein the SDT configuration is configured through a Radio Resource Control (RRC) release message.

* * * * *